Feb. 18, 1930.　　J. G. YONKESE　　1,747,564
CONTROL MECHANISM FOR AIRCRAFT
Filed May 14, 1925　　11 Sheets-Sheet 5
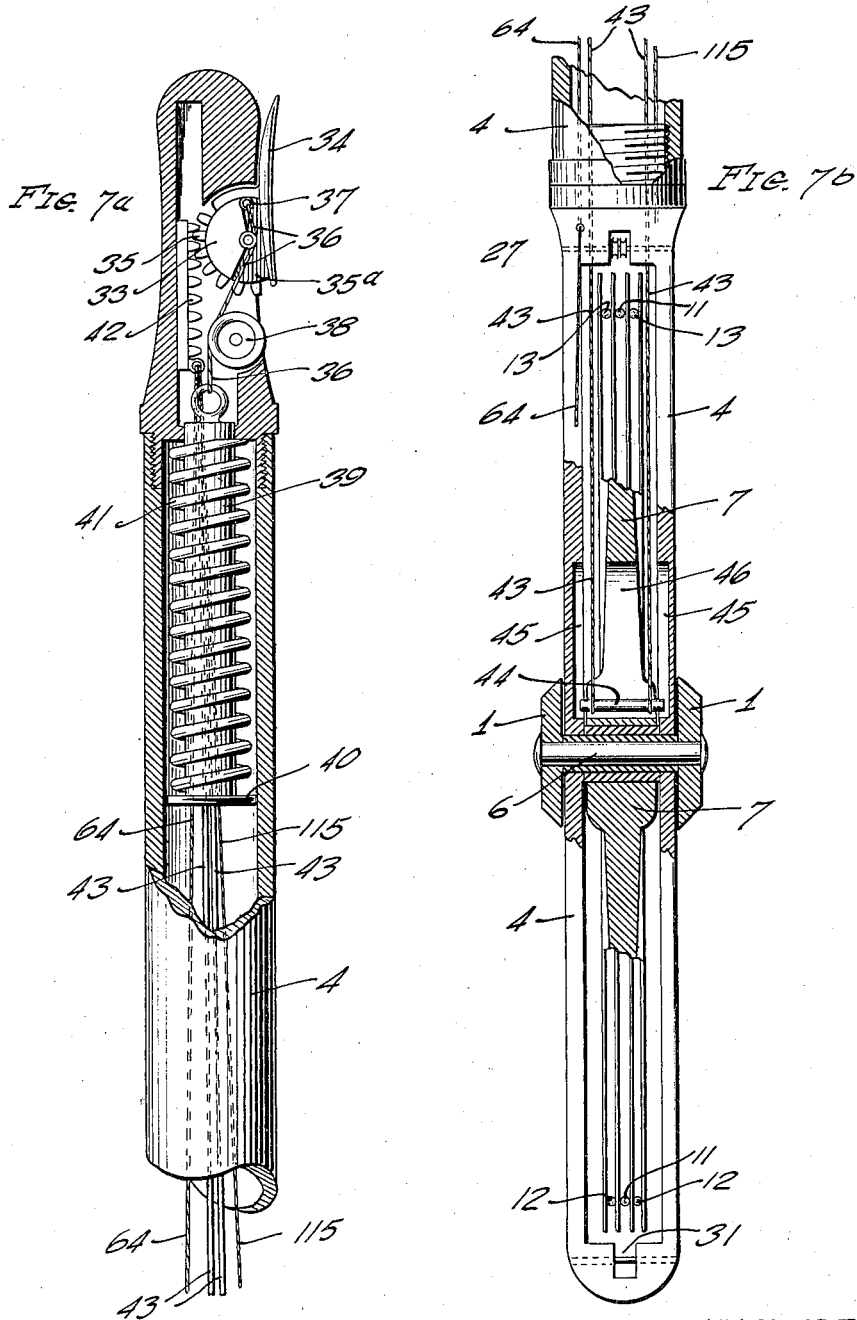
INVENTOR
JOSEPH G. YONKESE
BY
ATTORNEY

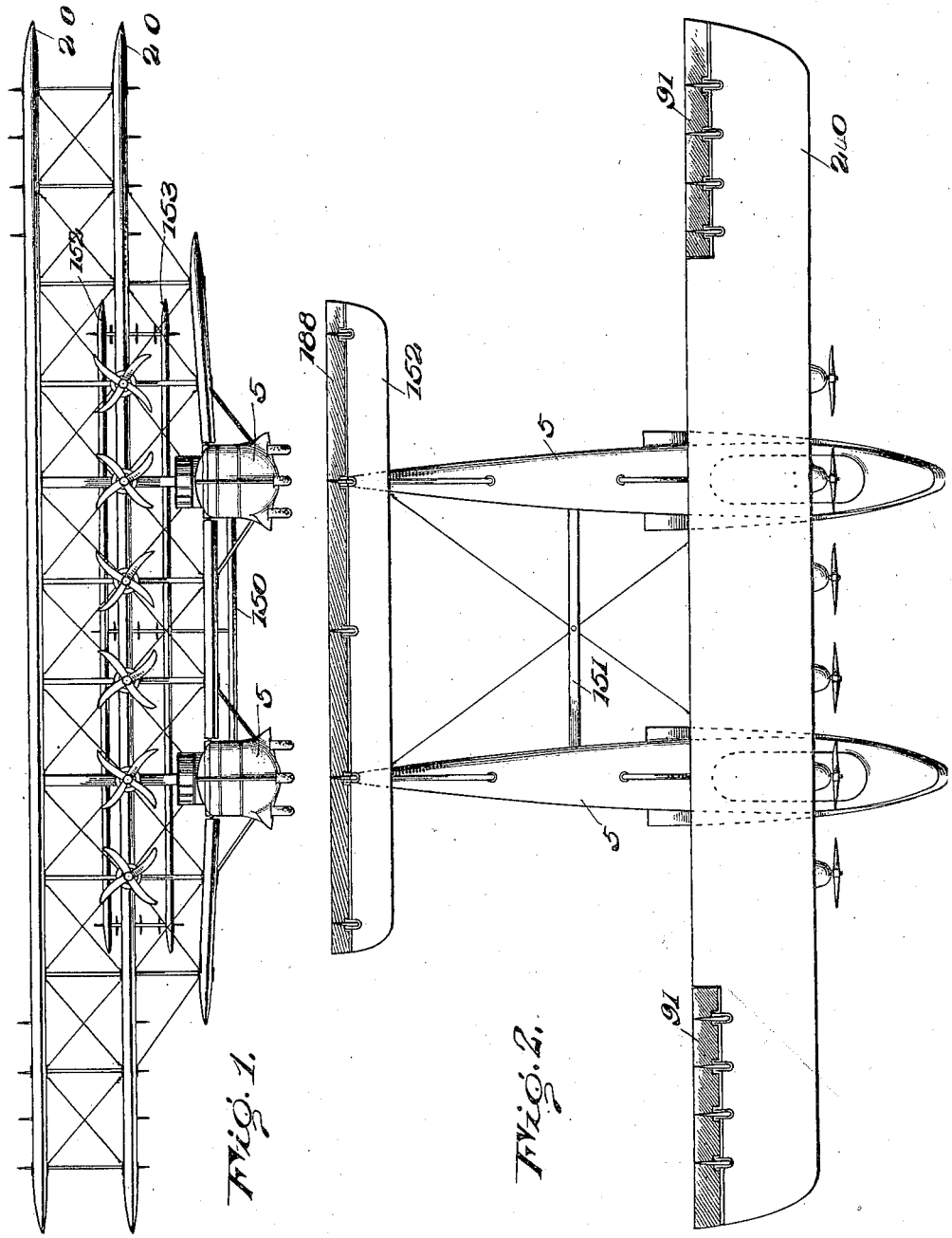

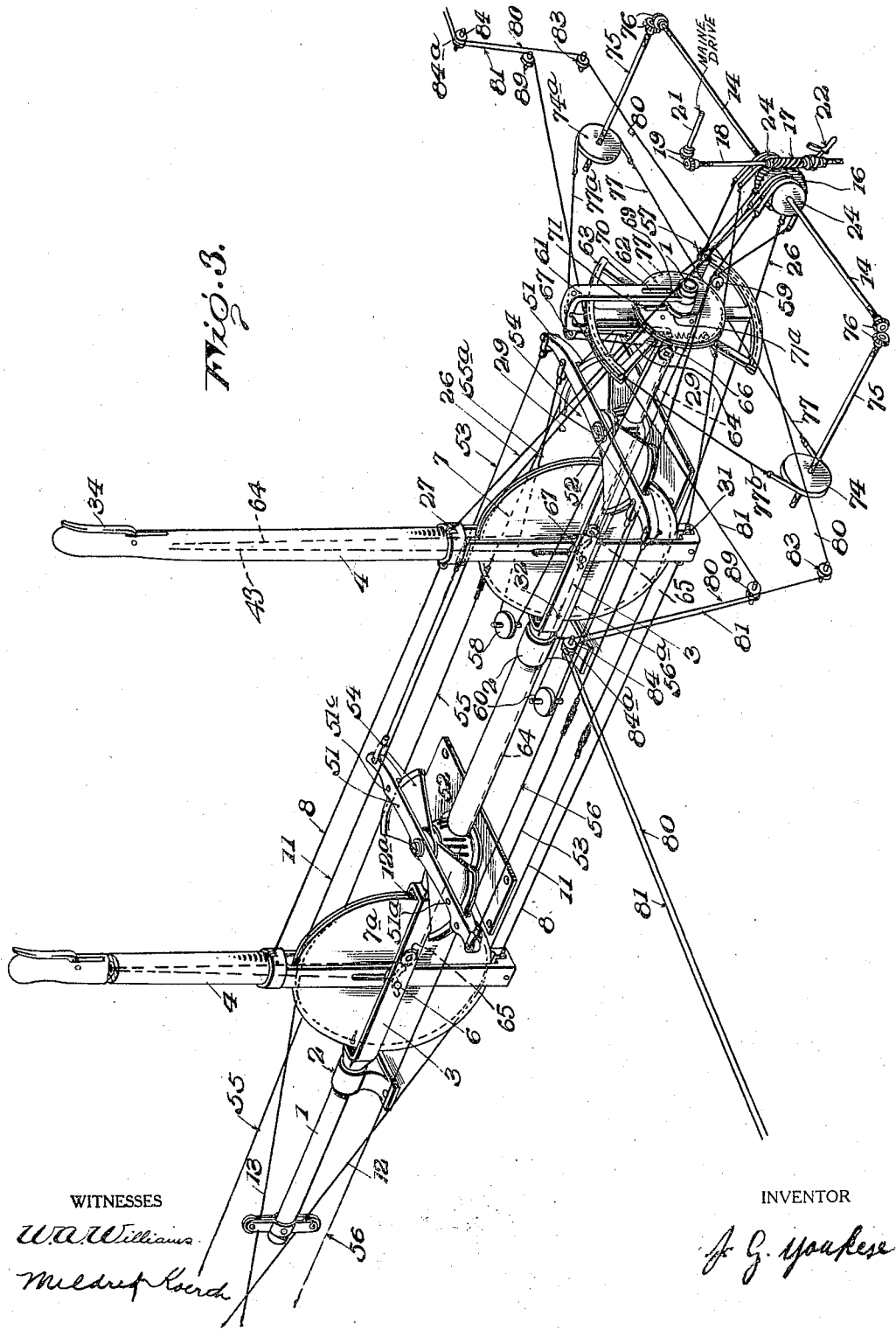

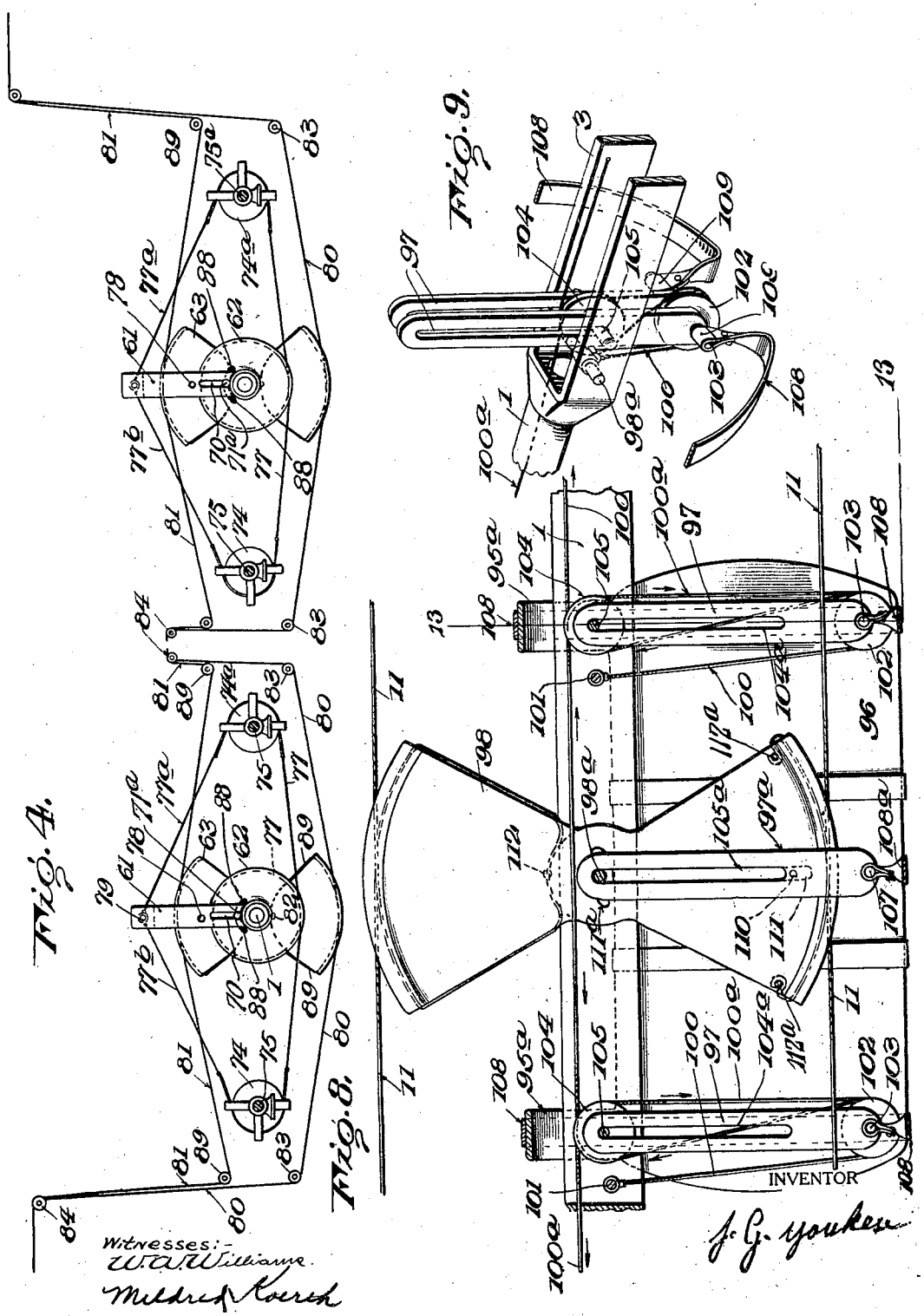

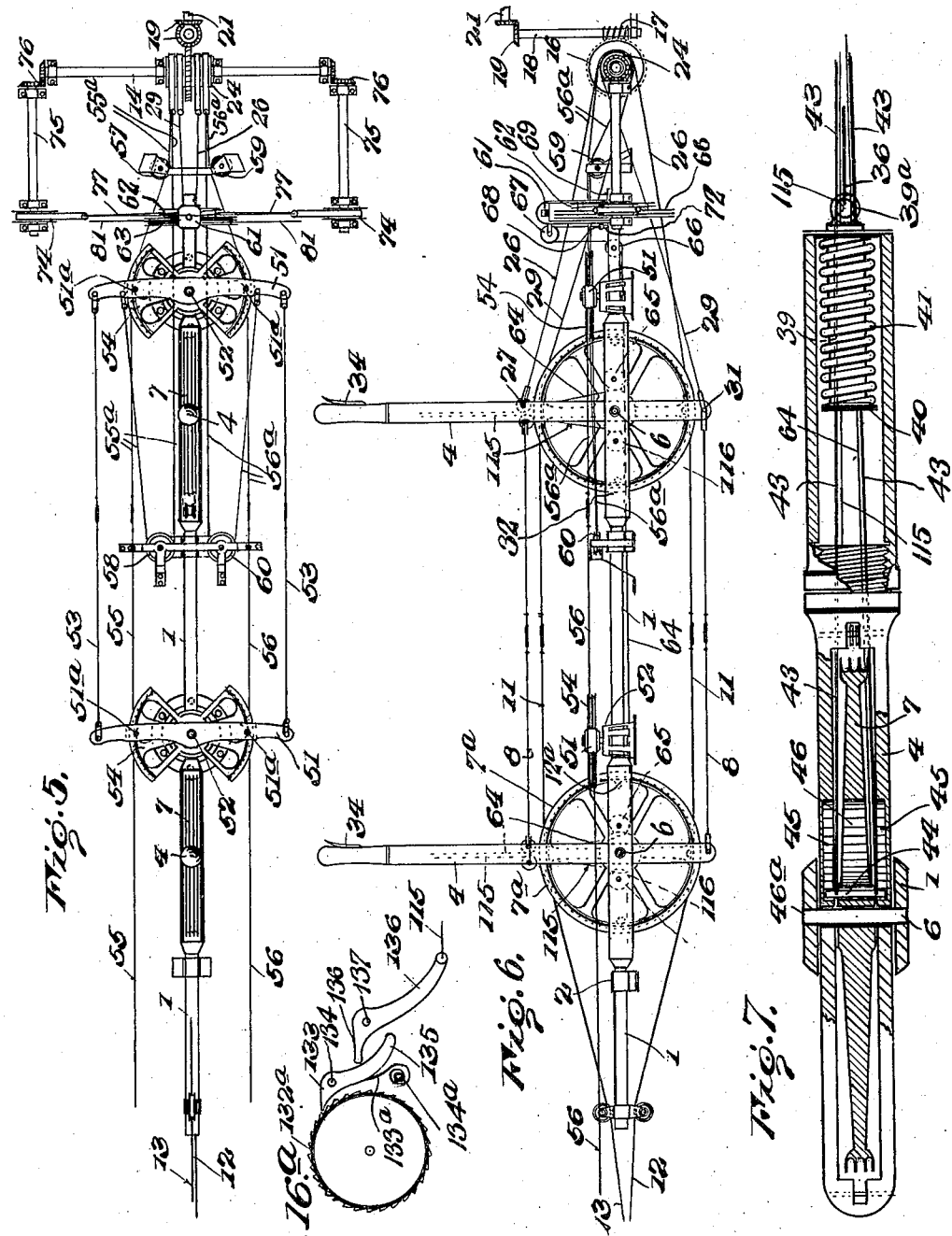

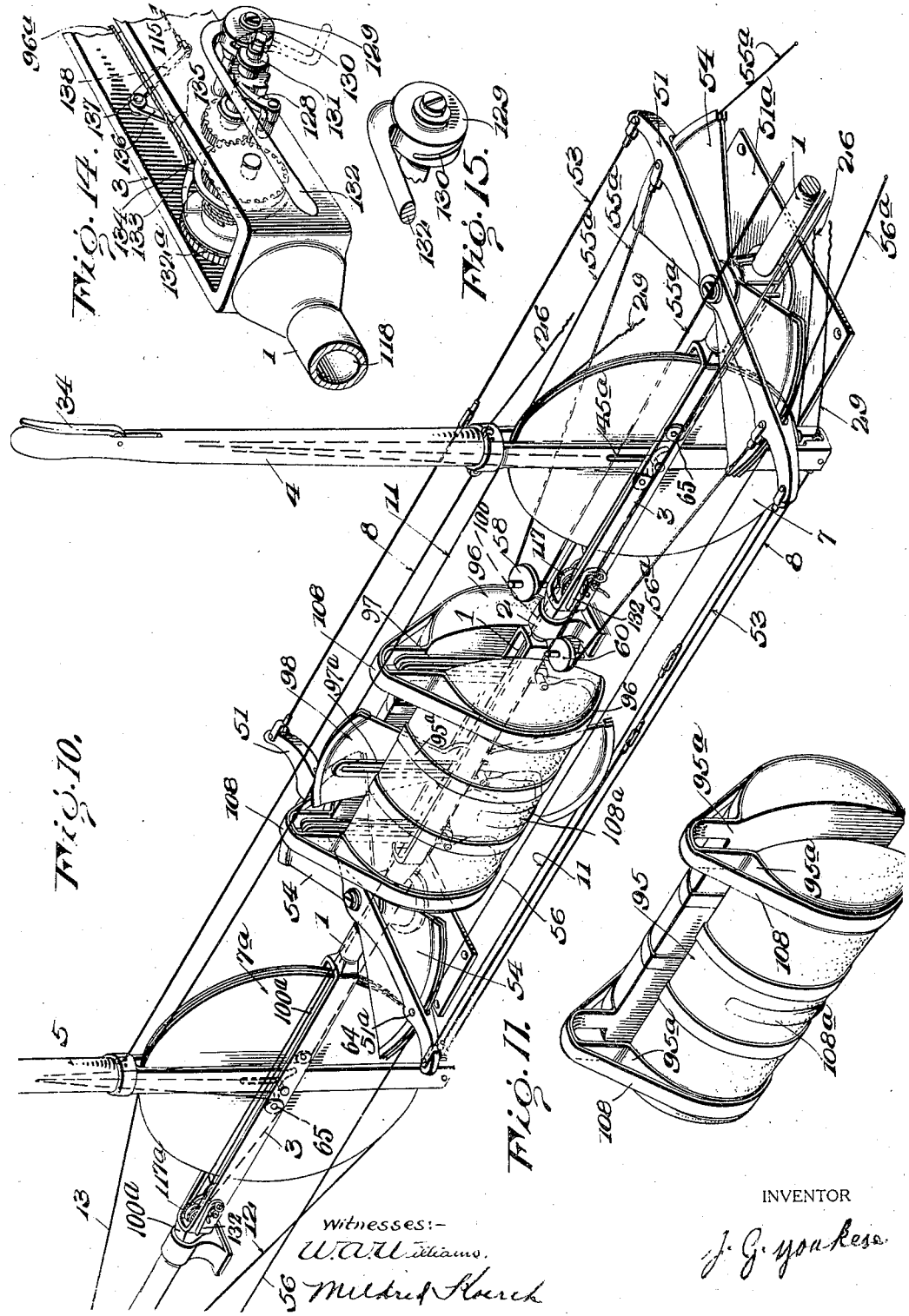

Feb. 18, 1930. J. G. YONKESE 1,747,564
CONTROL MECHANISM FOR AIRCRAFT
Filed May 14, 1925 11 Sheets-Sheet 7
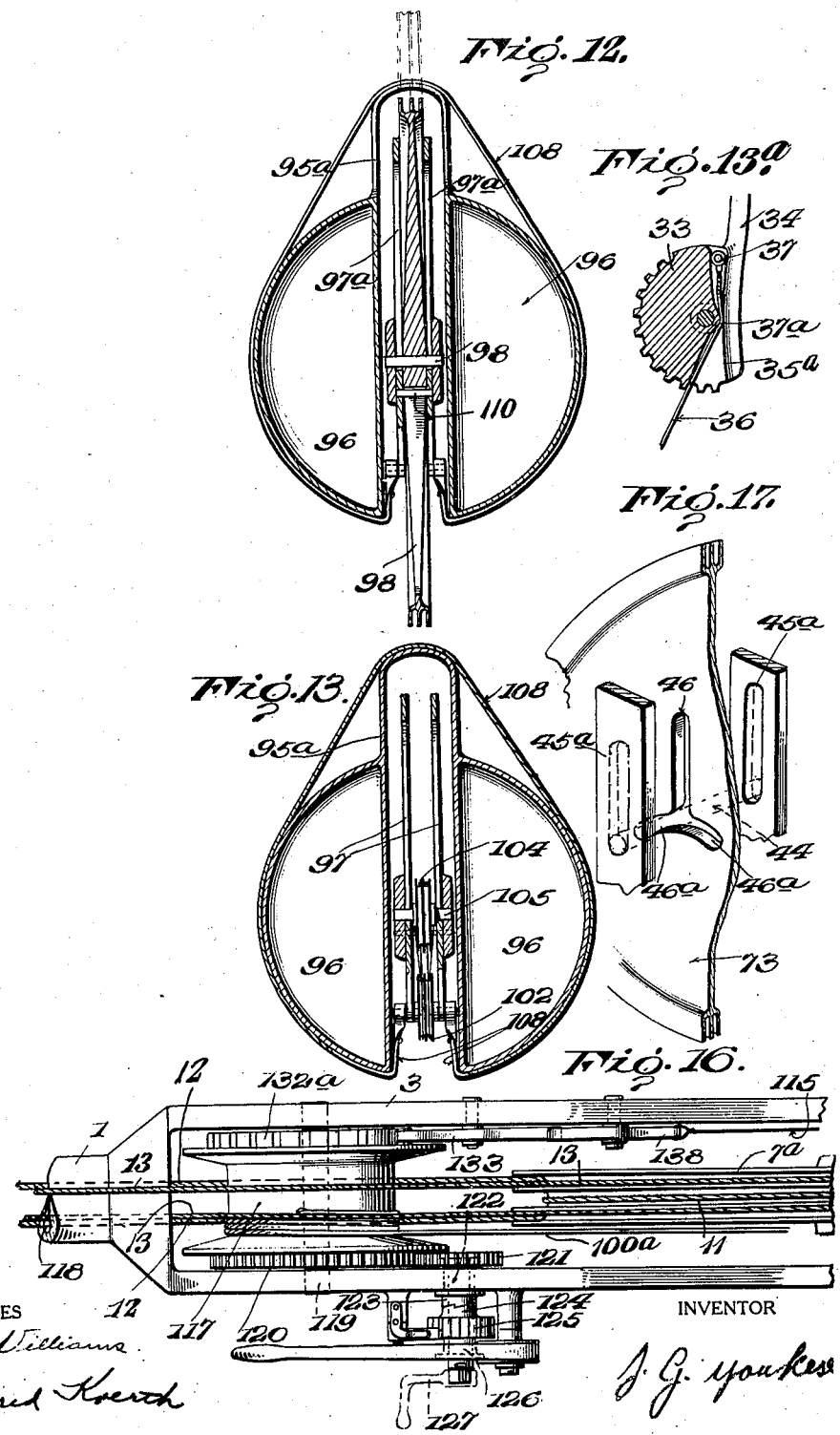

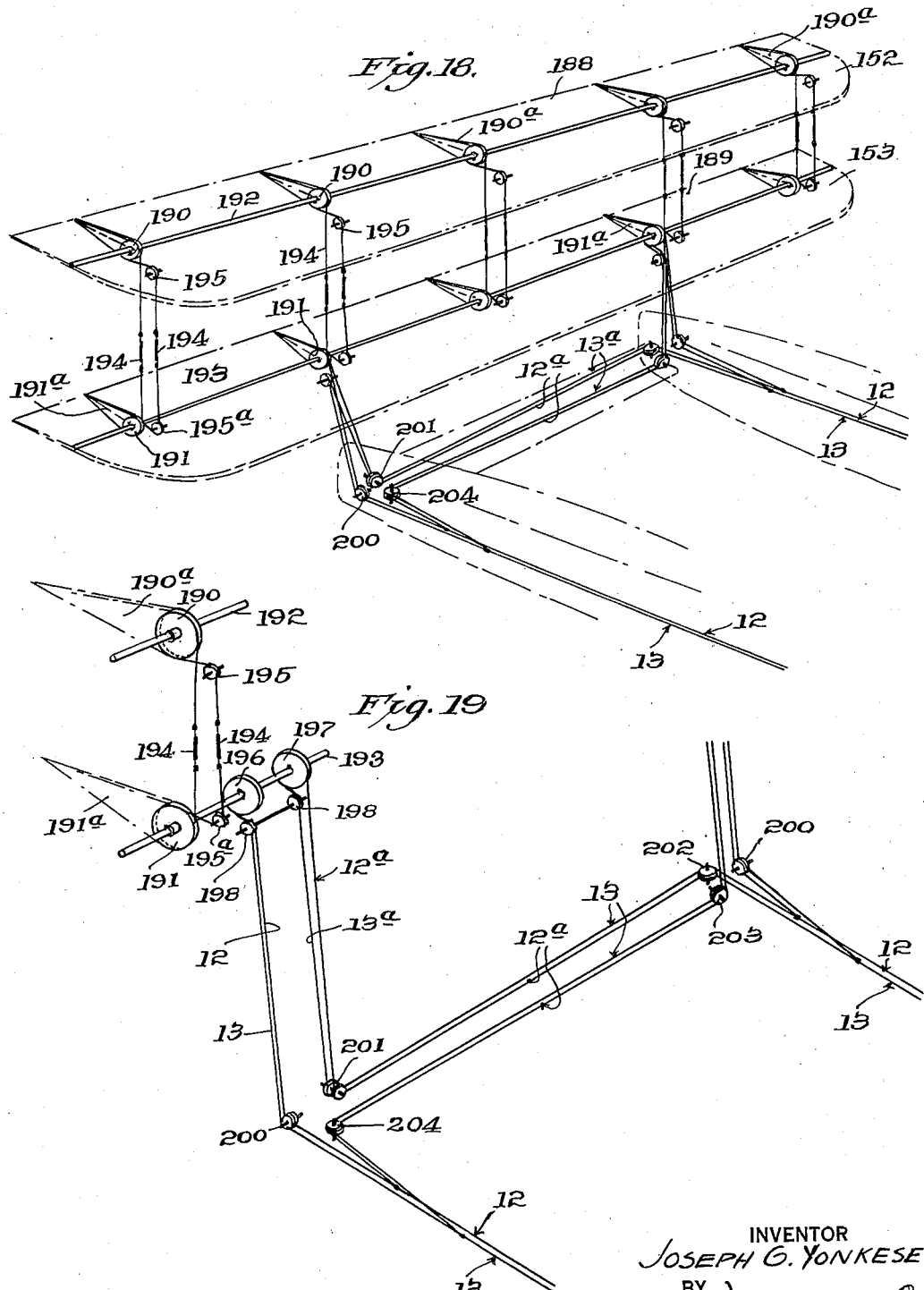

Feb. 18, 1930.     J. G. YONKESE     1,747,564
CONTROL MECHANISM FOR AIRCRAFT
Filed May 14, 1925     11 Sheets-Sheet 9

INVENTOR
Joseph G. Yonkese
BY
ATTORNEY

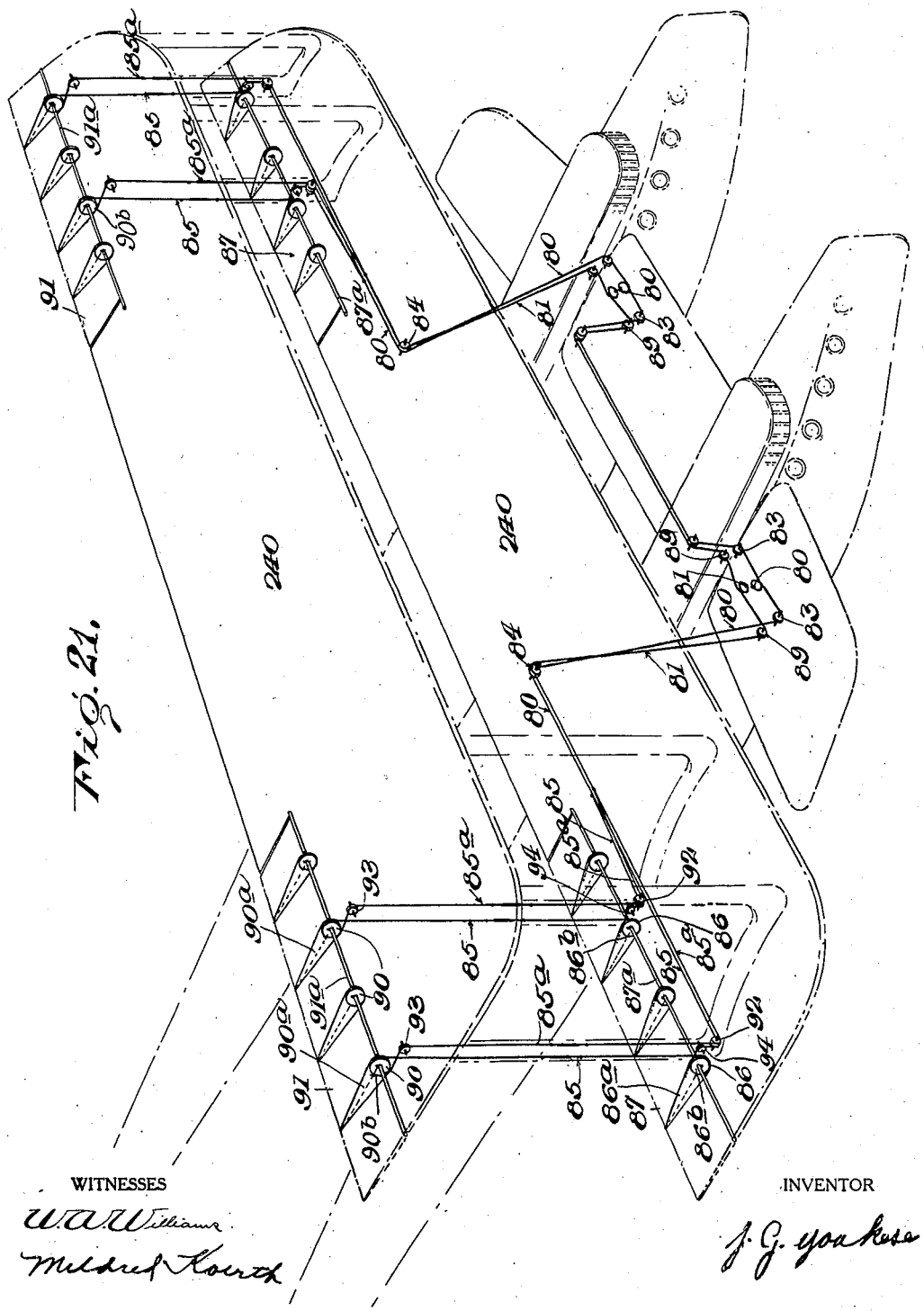

Feb. 18, 1930.  J. G. YONKESE  1,747,564
CONTROL MECHANISM FOR AIRCRAFT
Filed May 14, 1925    11 Sheets-Sheet 11
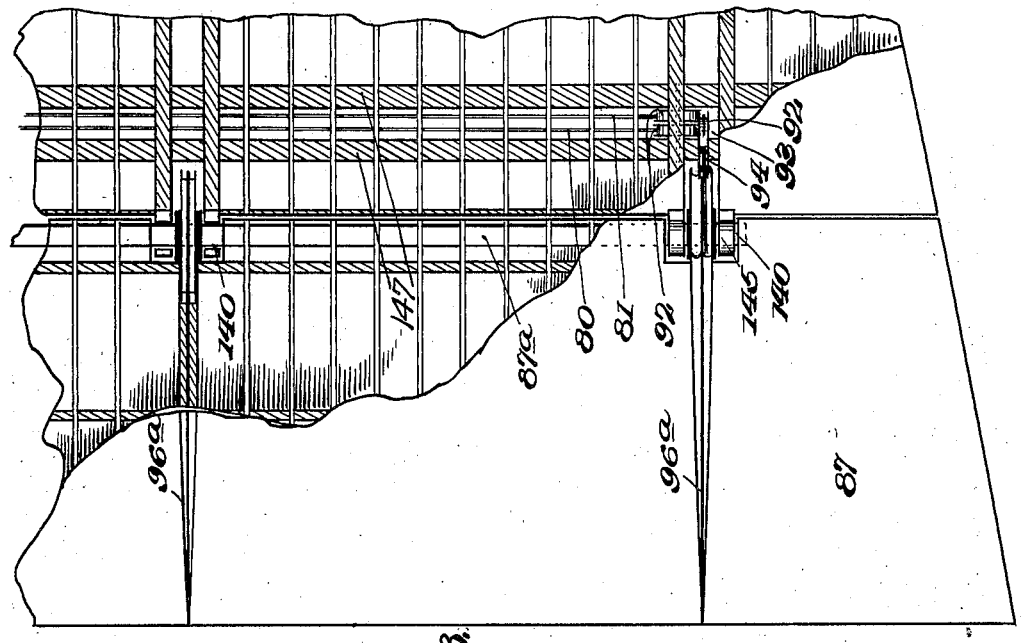
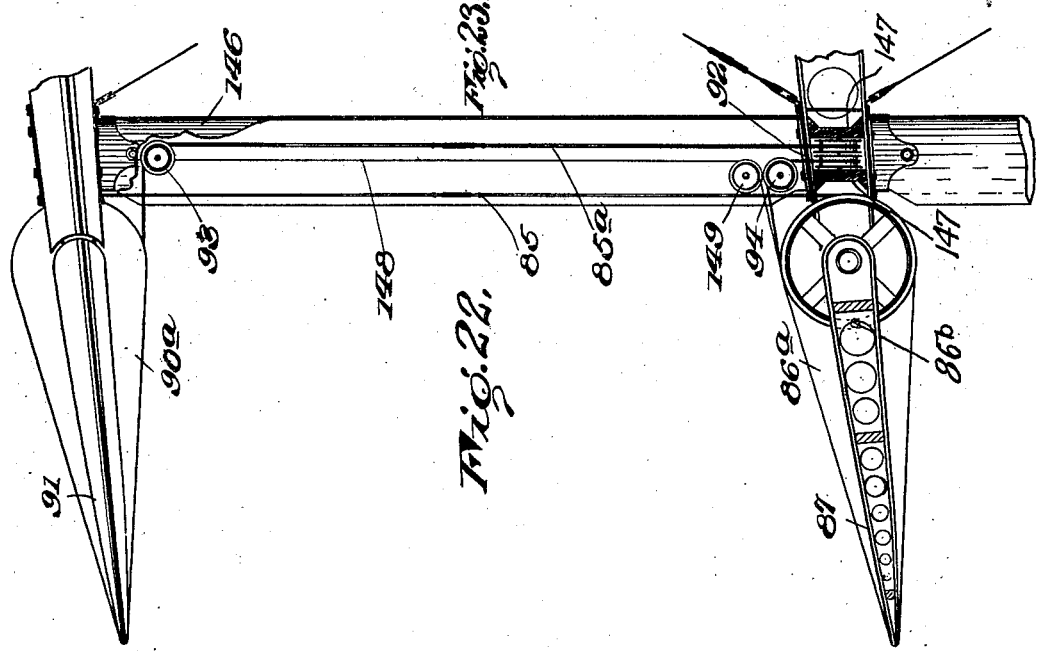
WITNESSES
INVENTOR Patented Feb. 18, 1930

1,747,564

UNITED STATES PATENT OFFICE

JOSEPH G. YONKESE, OF BROOKLYN, NEW YORK

CONTROL MECHANISM FOR AIRCRAFT

Application filed May 14, 1925. Serial No. 30,135.

The present invention relates to improvements in aircraft and has particular reference to the control mechanism of aircraft. It is particularly proposed in this invention to provide an improved control mechanism for the control of the elevators, the rudders and the ailerons. It should be kept in mind that my whole invention has particular reference to a large aircraft comprising a plurality of bodies interconnected in a suitable manner and made to carry a large number of passengers.

In an aircraft of this character considerable power is required for manipulating the various control elements, and it would usually be beyond the strength of the pilot to manually exercise the control through any length of time without being fatigued. It is proposed therefore as one of the main features of my invention to provide means for an assisting control mechanism for affecting the pull of the various control elements in such a manner that in a slight movement of the joy stick in the proper direction, the pilot may be able to handle a large flying machine, just as easily as a small scout machine. For the assisting mechanism referred to, I employ a continuous rotary motion which may be transmitted either by the power plant or by an air fan propeller, which receives its rotary motion by means of the speed of the machine while forcing through the air.

It is further proposed to provide means in this connection which allows the assisting control to be rendered inactive at the option of the pilot so that he may assume the whole burden of exercising the control if he so desires. A further object of the present invention is to provide automatic means for effecting a control of the elevators as well as that of the ailerons in case the pilot for some reason becomes disabled. In this connection it is proposed to utilize a weight which is normally supported so as to be inactive but which may be dropped into an operative position by the mere pulling of a trigger, and which when thus dropped will by swinging in accordance with the motions of the aircraft operate a pivoted member corresponding in its action to that of the joy stick for setting the elevators to raise the front end of the aircraft when the latter dips and for lowering the front end when the latter rises. The weight when dropped is furthermore arranged to rock a longitudinal shaft in a similar manner as the joy stick would do if actuated by the pilot for effecting the ailerons control.

In addition it is proposed to provide means whereby the trigger previously referred to is automatically pulled when the pilot becomes disabled and loses his grip on the joy stick.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a front view in elevation of an aircraft constructed in accordance with the principles of my invention.

Figure 2 is a plan view of the same.

Figure 3 is a view in perspective of the general control operating mechanism showing means connecting the assisting power control to cooperate with the manual control.

Figure 4 is an end view of Figure 3 showing means connecting the assisting power control to cooperate with the manual control for controlling the ailerons looking from the front of the ship.

Figure 5 is a longitudinal plan view of Figure 3 showing means connecting the assisting power control to cooperate with the manual control for controlling the rudders.

Figure 6 is a longitudinal side view in elevation of Figure 3 showing means connecting the assisting power control to cooperate with the manual control for controlling the elevators.

Figure 7 is an enlarged sectional view of a joy stick employed in my control arrangement, with the upper end broken away showing a spring actuating means for operating the various control elements.

Figure 20:
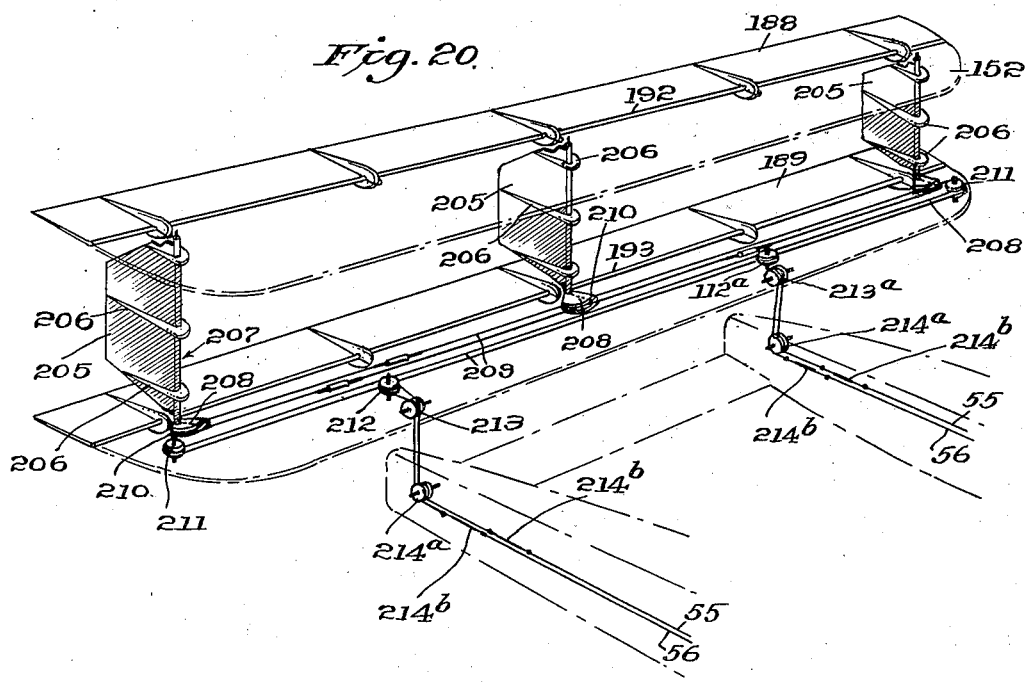

Figure 7ª is an enlarged fragmentary vertical section of the upper end of the joy stick shown in Figure 7.

Figure 7ᵇ is an enlarged fragmentary vertical section of the joy stick disclosing the locking means for a pulley associated with the joy stick.

Figure 8 is a fragmentary view in sectional elevation of a weight in operative position for automatically controlling the aircraft.

Figure 9 is a view in elevation of the supporting means for the weight.

Figure 10 is a view in perspective of the general control operating mechanism disclosing the connections with the weight.

Figure 11 is a view in perspective of the weight in the form of a fuel tank.

Figure 12 is a transverse vertical section of the fuel tank or the weight, showing the same in inoperative position.

Figure 13 is another transverse vertical section of the weight taken along line 13—13 of Figure 8.

Figure 13ª is an enlarged view of the sector member used in my joy stick.

Figure 14 is a fragmentary view in perspective of a device for controlling the weight.

Figure 15 is a fragmentary view in perspective of the cam actuating means for the mechanism shown in Figure 14.

Figure 16 is an enlarged fragmentary plan view of the device shown in Figure 14 disclosing the arrangement for suspending or lowering the weight.

Figure 16ª is a fragmentary side view of a more or less conventional type disclosing the mechanism for retaining the weight against displacement.

Figure 17 is a fragmentary view in perspective showing the disposition of the locking arrangement of the manual control relative to the assisting power operating control.

Figure 18 is a view in perspective showing the elevator control arrangement at the empennage.

Figure 19 is a view in perspective showing more or less diagrammatically the disposition of the connections of the control wires or cables for operating the elevators at the empennage.

Figure 20 is a view in perspective showing the rudder controlling arrangement at the empennage.

Figure 21 is a view in perspective of the planes of the aircraft showing the aileron controlling arrangement.

Figure 22 is a side view partly in section of the aileron controlling arrangement at the wings of the aircraft showing the method of housing the aileron control wires.

Figure 23 is a plan view, with parts in section, of the arrangement of housing the aileron control cables also disclosed in Figure 22.

To explain the control mechanism for the elevators reference is first had to Figure 3, from which it appears that a longitudinal shaft 1 is supported in the bearings 2 with freedom of revolving or rocking motion. The bearings are mounted in any approved manner in the interior of the bodies 5. The shaft is slotted at different spaced places 3 so as to straddle two joy sticks 4 pivoted to the shaft as shown at 6, the joy sticks being further slotted to straddle two pulleys 7 and 7ª also pivoted at 6. Normally the joy sticks and the pulleys move independently on the pivots 6.

The two joy sticks, either one of which may be operated by the pilot for controlling the aircraft, are interconnected by means of two wires 8, one disposed at the lower ends of the joy sticks and one above the pivot 6 at a distance equalling that between the pivot and the lower ends of the joy sticks. These two wires cause the two joy sticks to move in unison whenever one of them is operated.

The two pulleys 7 and 7ª are also interconnected for simultaneous rockable motion by means of an endless wire 11 passing around said pulleys and secured to each of said pulleys. The two wires 12 and 13 shown in Figures 3 and 6 are connected to the elevators as shown in Figures 18 and 19 in such a manner that a forward pull exercised on the wire 12 will raise the elevators and a forward pull on wire 13 will lower the elevators. The two wires 12 and 13 are fastened as shown at 12ª to the pulley 7ª whereby operation of either pulley actuates wires 12 and 13.

In front of pulley 7 there is provided a shaft 14 having a worm gear 16 fixed thereto, which latter may be operated by means of the worm 17 on the shaft 18 connected through beveled gears 19 with a shaft 21 receiving continuous rotary motion from the power plant of the aircraft or by means of an air fan propeller (not shown) which receives its rotary motion by the speed of the machine while forcing through the air, so that the shaft 14 is rotated continuously except when the worm 17 is disengaged from the worm gear 16 by means of a cam lever 22 pivoted as shown at 23 by means of which the shaft 18 may be pulled away from the worm gear. Shaft 18 may be a flexible shaft. A clutch of any form may be employed and operated by a link from the pilot's seat instead of lever 22.

The shaft 14 also has a pair of grooved drums 24 mounted thereon which rotate with the shaft and over which are guided two sections 26 and 29 of a continuous band of wire with the sections being entrained and connected as follows: The continuous band of the wire is fastened in a groove at the rear center of the pulley 7, as shown at 32, one end of which is described as wire 26 is passed around the bottom of the pulley and from the bottom up around a drum 24 and fastened to the joy stick as shown at 27 above the pulley. The other end described as wire 29 is passed around the top of said pulley and from the bottom up around a drum 24 and fastened to the lower end of the joy stick as shown at 31, the wire 29 being twisted to effect a reversal of motion between said pulley and drum 24.

Normally when the joy sticks are held in neutral position the two wires 26 and 29 are slack so that the rotation of the drum 24 does not effect the pulley 7. When, however, the joy stick is swung backwardly or forwardly by the pilot, either the wire 26 or the wire 29 will then be tightened and the rotary motion of the drum 24 will then be transmitted to the pulleys 7 and 7ª as will be more fully described.

Referring to the specific instance, if the pilot wishes to dive he pushes the joy stick 4 forwardly, whereby the wire 29 will be placed under tension and the rotary motion of the drum 24 is transferred to the pulley 7. If the drum 24 as viewed in Figure 3 rotates counter-clockwise, pulley 7 will be rotated clockwise, and this motion will be transferred through the wire 11 to the second pulley 7ª, which latter will pull on the wire 13 thereby lowering the elevators which causes the aircraft to dip. When the pilot wishes to raise the front end of the aircraft, he pulls back on the joy stick, thereby tightening the wire 26 which latter causes the pulley 7ª to rotate counter-clockwise and to pull on the wire 12, thereby raising the elevators which latter cause the aircraft to incline upwardly.

As previously stated, the joy stick 4 and the pulley 7 are normally mounted on the pivot 6 for independent motion. The pilot is enabled however to cause the two elements to coact in case he wishes to dispense with the assisting power drive. To allow of this change I provide a mechanism arrangement within the construction of the joy stick, as shown in detail in Figures 7, 7ª and 7ᵇ, which illustrates three enlarged sectional views of the same.

The mechanism referred to serves for the exercising of the elevator control and the aileron control, and is operated by the pilot simply by holding up a hand piece fitted in a suitable manner at the grip of the joy stick. When the hand piece is held up it will allow, as previously described, the joy sticks 4 and 4ª and the pulleys 7 and 7ª employed for the elevator control to move on the pivot 6 independently; and also the stick 61 and pulley 62 employed for the aileron control to move independently. When the hand piece is dropped it will cause the two elements to coact, that is, will lock the pulleys 7 and 7ª to the respective joy sticks 4 and 4ª, and the pulley 62 to its respective stick 61 thereby causing the sticks to move the pulleys directly.

This mechanism is very simple and in detail consists as follows:

In the upper end of the joy stick there is pivotally mounted a sector 33 as shown in Figure 7ᵇ, provided with a handpiece 34 rigid with the sector which may be conveniently gripped by the pilot and held against the joy stick with slight pressure. The sector has a toothed portion 35 and a slot as shown at 35ª (Figure 13ª). The slot in the sector accommodates a wire 36 leading from its pinned point 37 and over a hub 37ª in the slot. The wire is carried downwardly over a sheave 38 and fastened to an eye 39ª of a bolt or spring guide 39 for suspending said bolt. The bolt is hollow for a purpose of accommodating the various wires operating the mechanism which are guided within the hollow bolt. A compression spring 41 bears on a shoulder 40 of the bolt and tends to force the bolt downwardly. The toothed portion of the sector, according to a preferred form of the invention, engages with a rack 42 having two rigid wires 43 depending therefrom which extend downwardly through the hollow bolt in the joy stick lifting a pin 44 which has its ends normally seated in vertical grooves 45 formed at the inner faces of the joy stick above the pivotal mounting of said stick. The pin is also slidable in a vertical slot 46 formed in the pulley 7 as shown in Figure 7, so that when said pin 44 is elevated it locks the pulley to the joy stick thereby causing the joy stick to drive the pulley directly. The slot 46 of pulley 7 has two arcuately shaped branches 46ª as shown in Figure 17, which will permit the pin 44 when in its lowermost neutral point of travel, to ride in said branches in order to prevent the pulley from being locked to its respective joy stick and to permit the joy stick to be moved in either direction within certain angular limits for tightening either wire 26 or wire 29 as the case may be, on the rotating drum 24 in order to apply the assisting power operating control to the manual control for operating the elevators. As shown in Figures 7, 7ª and 7ᵇ, wires 43 leading from rack 42 are connected to the pin 44 upon opposite sides of the pulley 7.

The wire 36 is connected above and slightly off the center of the sector so that a pilot may easily hold the hand piece 34 in the position illustrated in Figure 7ª, due to the position of the connecting point 37. A strong spring will exert only a slight pull, but if the pilot for some reason releases the hand piece then the spring 41 will act and exert a downward pull on wire 36, rotating sector 33 and raising the rack 42, and through the wires 43, lift the pin 44 as previously stated thereby locking the pulley 7 to the joy stick 4. Since pulley 7 is locked to said joy stick the latter when rocked will rotate the pulley directly since neither wire 26 or 29 is tightened.

The pilot may now exercise direct control over the pulley 7, it being remembered that the assisting power control was only brought into action by the differential actuation of the joy sticks relative to the pulleys. Since the pulleys and joy sticks are locked for simultaneous movement, there will not be any tightening of either the wire 26 or the wire 29 on the rotating drum 24 for applying power to pulley 7.

Rudder control

In a similar manner I effect the assisting power control for the rudders which is illustrated in Figures 3, 5 and 10. As known in the art of aircraft designs, the rudders or rudder control of an aircraft is usually operated by means of a foot pedal usually called rudder bar. As my arrangement in order to apply the assisting power control for controlling the rudder, I provide the two rudder bars 51 mounted on pivotal basis 52. The latter pivotal basis being so formed with a bearing in order to accommodate the main shaft 1. The two rudder bars, either one of which may be operated by the pilot for controlling the rudders, are interconnected by means of the wires 53, one disposed on the right hand side and the other on the left hand side. These two wires cause the two rudder bars to move in unison whenever one of them is operated. Said rudder bars are slotted so as to straddle two pulleys 54 also pivoted at 52. Normally the rudder bars and the pulleys move independently on the pivot 52. The two pulleys 54, are also interconnected by means of two continuous wires 55 and 56 passing around both of them and secured to both of them so that they always move in unison. Said wires may be designated as main rudder control cables, and may be divided into four sections as 55 and 55ª, 56 and 56ª connected by means of adjustable turnbuckles in order to regulate their tension and they continue as follows:

The sections of the wires designated at 55 and 55ª are at the left hand side and the sections 56 and 56ª are at the right hand side of shaft 1. Each pair of the sections are connected together midway between the front and the rear pulleys 54 as shown in Figure 5. Sections 55 and 56 are looped around the quadrant shaped portion on either side of the rear pulley 54 secured to points on the pulley adjacent the center of the pulley and guided over the outer disposed grooves of the said pulley, both ends of the sections extending through the body or bodies 5 toward the tail end of the same and connected as shown at 214ª and 214ᵇ (Figure 20) to the rudder control wires 209 leading from the rudders at the empennage. Sections 55 and 56 referred to are connected to the said wires in such manner so that a pull on wire 55 will turn the rudders to the left thereby causing the aircraft to turn to the left, and a pull on wire 56 will turn the rudders to the right causing the aircraft to turn to the right.

The two sections 55ª and 56ª are looped around the quadrant shaped portion on either side of the front pulley 54 secured to points on said pulley adjacent the center of the pulley and guided over the outer disposed grooves of the same on either side and are erected as follows: Section 55ª leading from the left groove of the pulley is passed over sheaves 57, over the rotating drum 24, then back again over sheaves 57, over a further sheave 58 and then fastened as shown to the left hand side of the front rudder bar 51. In a similar manner the section 56ª leading from the right groove of the front pulley 54 is passed over sheaves 59, over the rotating drum 24, then back again over sheaves 59, over a further sheave 60, and then fastened as shown to the right hand side of front rudder bar 51. The last two mentioned sections 55ª and 56ª serving for applying the assisting power control to the manual control for controlling the rudders. The sections are so arranged and connected between the last mentioned pulley 54, the rotating drum and the front rudder bar that when both rudder bars are held in neutral position, both sections 55ª and 56ª are normally maintained slack, permitting the drum 24 to rotate idly without effecting the pulley 54. When, however, one of the rudder bars is pressed on either the left or right hand side by the pilot, either the wire section 55ª or 56ª is tightened upon the rotating drum and the rotating motion of the drum will then be transmitted to the front pulley 54, which latter through the rear pulley 54 will pull on cables 55 or 56 as the case may be for turning the rudder to the left or to the right thereby causing the aircraft to turn to the left or to the right. It must be borne in mind that the assisting power operating control applied to the manual control for the rudders, has no connections with the sector 33 and the handpiece 34. Therefore, if the pilot wishes to eliminate the action of the assisting power drive, either one of the pulleys 54 may be fixed to their respective rudder bars 51 simply by means of a pin 51ª provided for that purpose which will cause the said rudder bars to drive the pulleys directly and thus preventing cables 55ª or 56ª from tightening upon the rotating drum and preventing the same from transmitting power to the manual rudder control.

Aileron controls

The assisting power drive is transmitted to the aileron control in a similar manner as to that of the elevators. It must be borne in mind that while the elevators are controlled by means of a rocking movement of the joy sticks in a vertical plane passing longitudinally through the shaft 1, the ailerons are controlled by means of a lateral rocking movement of the joy sticks in a plane at right angles to the axis of the shaft. In accordance with my arrangement, in order to apply the assisting power drive to the aileron controls, I provide a stick 61 which latter is firmly secured to the main shaft 1 in alinement with the joy stick 4 so that the stick 61 will be rocked simultaneously with the stick 4 by the lateral rocking motion of the shaft. Said shaft has also a pulley 62 rockably mounted thereon and a second somewhat larger mutilated pulley 63 fixed to or formed integrally with the first pulley. The stick 61 being slotted to straddle the said pulley and the pulley being mounted on shaft 1 for independent motion relative to the stick 61, the pilot is enables however to cause the two elements to co-act in case he wishes to eliminate the action of the assisting power drive when he drops the hand piece 34.

As it was stated for the mechanism arrangement of the elevator controls, when the hand piece 34 is dropped it will cause to rotate the sector 33 which latter will lift a rack 42 and through the wires 43 will lift a pin 44 locking the pulleys 7 to the joy sticks 4, thereby causing the joy sticks to drive the pulleys directly. The said mechanism is furthermore arranged so that when the hand piece 34 is dropped and rotates the sector, will also pull on a wire 64 which latter is connected to the rack 42 and from thence is carried downwardly through the joy stick and passed over a sheave 65 pivoted on the inner face of the slotted portion 3 of shaft 1, said sheave being pivoted in an adjusted angle in front of the pivot 6 of the joy sticks so that the back and forward motion of the same will not cause the wire 64 to become tightened or loosened. The latter wire is carried forwardly through the hollow portions of shaft 1 and passed over sheave 66 pivoted in the same shaft, then over a further sheave 67 pivoted at the upper end of stick 61 and fastened to an eye 68 rigid with a bolt 69 passed through the vertical slots 70 of stick 61 and slot 71 of pulley 62. The pulley has also two arcuately shaped branch slots 71ª allowing the bolt 70 when in its lowermost neutral point to ride in the latter slots preventing the pulley from being locked to the stick 61 when latter is rocked with the shaft 1. The bolt is held down in its lowermost point by means of an elastic 72 fastened to a second eye bolt rigid with the same bolt.

As previously stated for the case of the elevator control, when dropped the hand piece 34 will cause to rotate the sector 33 which latter lifts the rack 42 and through wires 43 will lift the pin 44 locking the pulleys 7 to the joy sticks 4, causing the latter to drive the pulleys directly, so also in the case of the aileron control, the dropping of the hand-piece will cause a pull on wire 64 lifting the bolt 69 locking the pulley 62 with the stick 61, thereby causing the latter to drive the pulley directly. It will be seen therefore that when the hand piece 34 is down it will lock the pulleys 7 to the joy sticks 4 and the pulley 62 with the stick 61 for simultaneous movement, and it will unlock the same for independent movement when said hand piece 34 is up.

The aileron control arrangement and the erection of control wires are illustrated in detail in Figures 4, 21, 22 and 23, from which it appears that on either side of pulley 62, as previously stated, are mounted drums 74 and 74ª on shaft 75 and 75ª. The shafts running parallel to the main shaft 1 are rotated continuously by bevel gears 76 from shaft 14 and in the direction indicated by the arrows in Figure 3. A flexible wire 77 is securely fastened at its middle portion in a groove at the top center of the pulley as shown at 78, with one free end looped clockwise and the other free end looped counter-clockwise around said pulley, the ends crossing each other at the bottom center of said pulley. The free ends of wire 77 being designated as 77ª and 77ᵇ, are passed respectively over the drums 74ª and 74 on opposite sides of the stick 61 and then fastened to the upper end of said stick, as shown at 79, Figure 4. When stick 61 is held in neutral position both the ends 77ª and 77ᵇ of the continuous wire 77, as in the control mechanism of the elevators and that of the rudders are normally maintained slack, permitting the drums 74 and 74ª to rotate idly without effecting any pull on pulley 62. When, however, stick 61 is slightly rocked in either direction from the vertical by main shaft 1, when the latter is rocked by the joy stick through the pilot, either wire 77ª or 77ᵇ will then be tightened upon the rotating drums 74 or 74ª, and bring into action the assisting power to rock pulley 62.

The large mutilated pulley 63 having two continuous flexible members 80 and 81 securely fastened thereon serving as the main aileron control cables. Said cables are connected between the ailerons and their respective operating member or pulley 63 as follows: As viewed in Figure 4, cable 80 is fastened at its middle portion below and adjacent the pivot of the pulley as shown at 82. One free end of the cable is then looped clockwise, while the other end is looped counter-clockwise around the pulley, the wires being entrained around the bottom of said pulley and crossing each other in a bottom groove of the same. The ends of the wires are then passed over sheaves 83 on right and left hand sides, then upwardly over further sheaves 84 and from thence they are erected through the camber of the middle or lower wing planes 240 as shown in Figures 22 and 23, preferably between the rear or the front spar beams 147 of said wings which may, in many instances, be found to be the most practicable for bringing said cables from the ailerons to the control operating seat, and for limiting the number of sheaves and turns in said cables.

The spar beams 147 may consist of metal or wood and have duplicate portions in order to provide a housing or chamber between the same for accommodating said cables and to form supporting bases for the sheaves or guides carrying the cables.

Cable 81 is fastened at its middle portion to pins 88 in order to clear slots 71 and 71$^a$ formed in the upper portions of pulleys 62 and 63. The free ends of latter cable being looped clockwise and counter-clockwise around the upper portion of pulley 63 crossing each other in the top grooves of the same in a manner similar to the arrangement described for cable 80 at the bottom. The ends of cable 81 are then passed over sheaves 89 right and left, and upwardly over second sheaves 84 and from thence are erected as previously stated through the camber of the wings 240 between the spar beams 147 of said wings.

As viewed in Figure 21, which illustrates in detail a general lay-out of the aileron controls, it will be seen therefore, that the free ends of cable 80 are connected to a group of wires 85 leading from the lower right and left ailerons, and the free ends of cable 81 are connected to a second group of wires 85$^a$ leading from the upper right and left ailerons. Wires 85 and 85$^a$ are substantially a continuous band but the free ends of said band are designated as 85 and 85$^a$ in order to distinguish their location. These ends are connected at midways between the upper and lower ailerons by means of adjustable turnbuckles to regulate their tension, and the exact alinement of the aileron. The free ends 85 which are connected to the free ends of cable 80, are passed over sheaves 92 and upwardly over sheaves 94, then looped counter-clockwise around the lower aileron control pulleys or cone-shaped members 86 of ailerons 87 and then securely fastened at the rear center groove of said pulleys, as shown at 86$^b$. These wires then extend upwardly with the other free ends designated as 85$^a$ looped counterclockwise around the upper aileron control pulleys or cone-shaped members 90 of ailerons 91, then over sheaves 93 and downwardly over second sheaves 92 and connected as previously described to the free ends of cable 81 right and left.

The wires 85 and 85$^a$ including sheaves 92, 93 and 94 carrying said wires, are hidden and located within the housing containers formed in the rear wings, struts and between the spar beams of the wings as shown in Figures 22 and 23. These wires are so arranged and connected to their respective main control cables that a pull exercised on either end of cable 80 will pull on wires 85 which will cause both the upper and lower aileron control pulleys or cone-shaped members to move clockwise thereby causing the upper and lower ailerons to incline upwardly. While a pull exercised on either end of cable 81 will pull on wires 85$^a$ which latter will cause the said upper and lower aileron control pulleys or members to move counter-clockwise thereby causing both the upper and lower ailerons to incline downwardly.

To better explain the action of this aileron control arrangement, cables 80 and 81 are connected to pulley 63 so that when said pulley is rocked in either direction one of the cables moves to the right, while the other moves to the left and vice versa. As has been previously stated, cable 80 is connected to wires 85 right and left, while cable 81 is connected to wires 85$^a$ right and left. As disclosed in Figure 21, it will be seen that when pulley 63 is rocked clockwise, it will pull on cables 80 right and 81 left, and releasing cable 80 left and cable 81 right, thereby raising the right ailerons and lowering the left ones, causing the aircraft to bank to the right. When said pulley 63 is rocked counter-clockwise it will cause a pull on cable 80 left and cable 81 right and releasing cable 80 right and cable 81 left, thereby raising the left aileron and lowering the right, causing the aircraft to bank to the left.

While the aircraft is resting either on the ground or on the water, the ailerons are maintained in the position illustrated in Figure 22 by means of a cross cable or balance wire 148. The latter wire is passed with free running motion through the upper wing planes extending both to the right and left and guided in roller guides or sheaves pivoted between the rear spar beams of the upper wings in a similar manner as has been described in reference to the sheaves 92 in the lower wings. The wire 148 is then extended downwardly through the wing struts over sheaves 149 and fastened at 86$^b$ to pulleys 86 of the right and left ailerons. The wire referred to does not take any part of the control, but serves to regulate the exact position of the ailerons and to take up the load stresses of said ailerons while the aircraft is on the ground or water, relieving said load stress from the control wires or cables and preventing the same from becoming slack.

My invention further contemplates the provision of an automatic control which is caused to become effective when the pilot, for some reason, becomes disabled and loses his grip on the joy stick, or where the pilot desires to release his control of the joy stick for the purpose of practice, or in the case he wishes to relieve himself, or in the case he wishes to dispense with the assisting power control.

This mechanism consists merely of an element forming a swinging weight which normally, when in its inactive position, does not in any manner interfere with the proper control and operation of the aircraft, but the weight when dropped into an operative position will, by swinging in accordance with the motion of the aircraft, operate a pivoted member corresponding in its action to that of the joy stick when normally actuated by the pilot to operate the controls of the elevators and ailerons.

The arrangement referred to need not necessarily add to the weight of the aircraft, since some device, such as a fuel tank or reservoir made for the purpose of carrying tools, ammunition, freight, or any sort of material which the aircraft would have to carry with it, may be employed as the weight.

Such an arrangement may be installed at any location in the aircraft which may be found most practical where it does not interfere with other mechanism, and the action of the weight when dropped into an operative position may be connected to the control operating mechanism in the pilot cockpit through flexible connections or bell cranks.

However for the purpose of illustration I employ a conventional form of fuel tank which acts as the weight, the latter being generally designated by the numeral 95 as shown in the drawings, preferably fitted to the main control operating shaft 1 and between the two pulleys 7 and 7$^a$. Said fuel tank is formed of two semi-cylindrical sections 96 spaced from each other to provide a slot, as it were, between the same in order that the tank as a unit may be made to straddle shaft 1. The portion of the shaft which is located between the semi-cylindrical section 95 is also slotted to straddle the hangers 97 and 97$^a$, the hangers 97$^a$ being divided in two vertical sections in order to accommodate pulley 98 pivoted to the main shaft 1 as shown at 98$^a$. If it is desired to utilize the fuel tank or reservoir as a weight it may be made hollow and two sections 96 may be secured to opposite sides of a U-shaped member 95$^a$ with straps 108 serving to reinforce the structure and support the same. The weight when in its inoperative position is normally supported by means of wires 100 and 100$^a$ fastened at one end to shaft 1 as shown at 101 in passing over pulleys 102 mounted at the inner faces of the weight as shown at 103 and over further pulleys 104 mounted on the shaft as shown at 105, and from thence along said shaft through any suitable manner to a fastening device which is arranged to release the wires when the pilot looses hold of the hand piece 34. This device will be explained later.

As long as the weight is in its normal position it is preferably arranged so that the center of gravity coincides with the center line of the shaft 1 in order that it will not interfere with the normal operation of the latter shaft. The dropped motion of the weight in case of release is limited by the hangers 97 and 97$^a$ and supported by same. Hangers 97 are pivoted to pins 103 carrying the pulleys 102, the latter hangers are slotted as shown at 104$^a$ with pins 105 carrying the pulleys 104, riding in the slots when the weight is is elevated or lowered.

The hangers 97$^a$ are also slotted as shown at 105$^a$ to receive the pin 98$^a$, the lower ends of the latter hangers being provided with pins 107 connecting said hangers, which support a pair of straps 108$^a$. The pins 103 and the pins 107 project behind the opposite face of their respective hangers sufficiently to receive a loop 109 as shown in Fig. 9 formed at the lower ends of straps 108 and 108$^a$ which are bent downwardly and outwardly to conform to the curvature of the outer wall of the semi-cylindrical portion of the tank. The remaining of the straps 108 are bent to conform to the curvature of the inside walls of the same cylindrical section of the tank, then over the upper U-shaped ends of the members 95$^a$. It will be seen by this construction that the weight of the tank is swingingly supported by means of the hangers 97 and 97$^a$ and the straps 108 and 108$^a$ through the connection with the pins 104. A strap 108$^a$ is secured to the pins 107 of the hangers 97$^a$ in a manner similar to the construction shown at the ends of the hangers 97. The straps 108$^a$ extend around the outside and inside walls of the tank only. The hangers 97$^a$ have a pin 110 connecting the two vertical sections of the same. This pin rides in a slot 111 formed in the pulley 98 during the vertical movement of the hanger 97$^a$ and the slot 111 has two arcuated shaped branches slots 111$^a$ formed in the central portion of the pulley adapted to accommodate the pin 110 when the weight is in its inactive position to prevent the pin from locking the pulley to the hamper when the weight is not employed.

The pulley 98 is of the same size as the two pulleys 7 and is arranged preferably midway between the two pulleys so that the connecting wires 11 between the two pulleys may also interconnect the pulley 98 so as to move in unison with the pulley 7. The wires 11 are passed over the grooves in the upper and lower ends of pulley 98 and the upper section of wire 11 is looped around the radially disposed sides of the upper portions of the pulley and fastened as shown at 112. The lower section of the wire 11 is fastened as shown at 112$^a$ at the lower portion of the pulley in order to clear the slot 111 of the pulley 98. The connection relation of the three pulleys is so arranged that, as long as the weight is in inoperative position and the aircraft is manually controlled by the pilot, the pulley 98 is carried by the two pulleys 7 and when however the weight is dropped and the aircraft is controlled automatically, the two pulleys 7 are then carried by pulley 98. When the control is manually exercised by the pilot the pulley 98 moves idly on its pivot 98ª and the pin 110 which connects the said pulley with the weight rides freely in the arcuated shaped branches slot 111ª of the pulley preventing the latter from being locked relative to the main shaft 1 and the weight. When however, the weight is dropped into an operative position the pin 110 then rides down the lowermost point of the slot 111 of the pulley locking the latter to the hangers 97ª of the weight which both the hangers and the pulley move on the same pivot, thereby causing the latter pulley to follow the longitudinal swinging motion of the weight, for effecting the control of the elevators. The weight when dropped is furthermore arranged so its lateral swinging motion will also rock the main shaft 1 for effecting the control of the ailerons.

Referring to the specific instance, if the aircraft tends to leave its horizontal level flying position, the swinging weight naturally will fall toward the direction in which the aircraft dips if longitudinally as well as laterally. Therefore by observing the functioning of this automatic control mechanism it can be seen that, when the aircraft tends to nose down the weight falls forwardly and when it tends to nose up it falls backwardly. If the weight falls forwardly as viewed in Figures 8 and 9 of the illustrations, the pulley 98 moves counter-clockwise and its rocking motion is transferred through the connecting endless wires 11 to the pulleys 7, causing the latter pulleys to move counterclockwise in the same manner as the joy stick would do if normally actuated by the pilot, and through the rear pulleys 7 will pull on the wire 12 thereby raising the rear end of the elevators causing the aircraft to come out from a nose dive. If the weight starts to incline upwardly the weight will naturally fall backwardly and rock the pulleys clockwise so that the joy sticks 4 will be drawn forwardly in the same manner as if actuated by the pilot and will pull on wire 13, thereby lowering the rear end of the elevators and causing the aircraft to dip. As the aircraft returns to its normal position so will the weight automatically return to its neutral position and releasing the pull on either the wire 12 or wire 13 and neutralizing the control.

In a similar manner is effected the aileron control. As previously stated the weight when dropped into an operative position is furthermore arranged so that its lateral swinging motion will rock a longitudinal shaft 1, which latter through the stick 61 and the pulleys 62 and 63 will pull on the aileron control cables 80 and 81 and effecting the control of the ailerons. By this arrangement therefor, it will be seen that if the aircraft tends to dip with the right wing down, for instance, the weight, naturally will fall toward the right whereby the shaft 1 with the pulleys 62 and 63 are swung to the opposite direction toward the left in a manner as if they were normally actuated by the pilot in order to raise the right wing. This functioning will pull on the cable 80 left and cable 81 right thereby raising the left aileron and lowering the right ones to raise the right wing. In a similar manner if the aeroplane tends to dip with the left wing, the weight falls toward the left, rocking the shaft in an opposite manner towards the right causing a pull on cables 80 right and 81 left, thereby raising the right ailerons and lowering the left ones in order to raise the left wing. As the aeroplane straightens out to its normal flying position, the weight returns to its neutral position releasing the pull on the control cables and neutralizing the controls.

The weight is normally maintained in an inactive position or suspended position by an instrumentality disclosed in Figure 14 located in the slotted portion 3 of the shaft 1 and at the rear of the pulleys 7 and 7ª. This device is particularly designed for the purpose of suspending the weight, releasing and controlling the same.

The weight being so arranged and it has as per its primary object so as to become automatically released only when the pilot for some reason loses his grip on the hand piece 34; unless otherwise desired.

If it is desired to drop the hand piece 34 for the purpose of practice or for the purpose of dispensing with the assisting power drive in order to exercise a direct control, in the latter case the weight should remain in its inoperative position without dropping. To allow these changes I employ a device within the slotted portion 3 of the main shaft 1 as previously stated, whereby the pilot is able however to exercise the two elements simply by pushing a little finger lever 132 in a forward or backward position.

This device is very simple and in detail consists as follows: As it appears in the slotted portion 3 of shaft 1 at the rear of pulleys 7 and 7ª as shown in detail in Figures 14 and 16, there is rotatably mounted a small drum 117 or 117ª and over these drums are wound the weight supporting cables 100 and 100ª leading from their respective pulleys 102 and 104 and directed through the hollow portion 118 of shaft 1 thence to the drums. Each drum 117 and 117ª is mounted upon an individual shaft 119 carried in each of bearings in the slotted portion 3 of shaft 1. Each drum is provided with a gear 120 rigid therewith and meshing with a gear 121 on a shaft 122 and adapted to be mounted in a bearing in the slotted portion of the shaft 1. A dog clutch 123 is rigid with the shaft 122 and is adapted to mesh with a complementary member 124 of the clutch which is rigid with a ratchet wheel 125, and shaft 126. The crank 127 on the end of the shaft 126 is adapted to rotate said shaft and the gears 121 and 120 and drums 117 or 117ᵃ when said crank is actuated. A pawl 128 engaging the ratchet wheel 125 prevents a reverse rotation of the shaft 126 and the drum 117. Disc 129 having an eccentric or cam groove 130 engaged by a disc 131 is adapted, when revolved by the finger lever 132 to move the disc 131 outwardly and carry with the same the ratchet wheel 125, thereby releasing the clutch member 124 from the clutch member 123 so that the tank 95 by reason of its weight will be permitted to be lowered and causing unwinding of the cables 100 and 100ᵃ from the drums 117 and 117ᵃ.

In order to permit the drums to be released for automatic rotation when the hand piece 34 is dropped, a ratchet wheel 132ᵃ is secured to said drum concentric with the shaft 119 and is adapted to have its teeth engaged by pawl 133, with a compression spring 133ᵃ keeping the pawl engaged with said ratchet wheel, the pawl is mounted on pivot 134 and the spring on pin 134ᵃ located on the inner wall of the slotted portion 3 of shaft 1. The outer free ends of the pawl is provided with a toe 135 adapted to be pressed by a dog nosed shaped trigger 136 pivoted at 137 on the slotted portion 3 of the shaft. The tail end 138 of the trigger being connected with wire 115 which extends through alongside the inner wall of the shaft 1, thence passed over a roll or sheave 116 rotatably mounted on the inner face of the joy stick 4 at the rear of the pivot 6 of the joy sticks, shown in Figure 6, thence extending through the said joy stick and connected to the sector 33. The wire 115 is so disposed behind and near the pivot 6 that it will not interfere with the proper operation of the joy stick and will not become taut during the back and forward movement of the joy stick to pull the trigger, or to become loose and slip off the pulley. When the pilot, however, for some reason lets go of the hand piece 34, the spring 41 will force the bolt 39 downwardly and cause the segmental member 33 to be revolved, thereby drawing on wire 115. As the wire is moved in the direction indicated by the arrow in Figures 14 and 16, the dog nose 136 of the trigger will depress the toe 135, releasing the pawl 133 from its ratchet wheel 132ᵃ, thereby permitting the weight to be lowered and revolve the drums 117 and 117ᵃ.

If it be desired to lock, at any time, the weight against an active position, or in other words prevent it from dropping, in the case that the pilot may desire to release the hand piece 34 for the purpose of practice or for the purpose of dispensing with the assisting power drive in order to exercise the control directly, it is only necessary to place the lever 132 in the position shown in Figure 14 whence the gears 121 and 120 will be locked against rotation since the pawl 128 locks the shaft 126 against rotation with the clutch members 123 and 124 in mesh. Thus when the trigger is pulled the weight will not fall.

If it is desired to permit the drums 117 and 117ᵃ to be released to rotation at the action of the weight when the trigger is pulled, it is only necessary to place the lever 132 or a reverse position in forwardly, whence the gears 121 and 120 will be released to rotation because the clutch member 124 is disengaged from the clutch member 123. When the pilot for some reason lets go of the hand piece 34 which permits rotation of the sector 33, the latter draws up the wire 115 pulling the trigger 136, depressing the toe 135 of pawl 134, disengaging the same from its teeth of the ratchet wheel 132ᵃ and releasing the drums 117 and 117ᵃ to rotation whereby the weight descends to active position.

Referring to the general control instrumentality of all the auxiliary movable control surfaces, it will be noted that a number of cone shaped members or pulleys are substituted for the usual elevators control horns, rudders control horns, aileron control horns or other such well known elements. The main purpose of employing such pulleys is to maintain the main control cables and all of the control wires tight at all times and at the correct tension without allowing any slack or lost motion in the same. These pulley members will cause the auxiliary movable control surfaces of the various controls to move always in unison, and all of the control wires or cables to move always in a parallel relation without any slack or lost motion in the wires during operation of the various controls. Said pulley shaped members of the different auxiliary movable control surfaces are the same size of the pulleys used for the general control operating mechanism and in certain cases the pulleys are mutilated in order to provide space for incorporating other mechanism and for reducing the weight of the same, the remaining portions of the mutilated pulleys being sufficient for the angular rotation which is normally required. Also the said pulleys may be made so as to open in a hinged manner in order to fit them to their respective bases as required in certain cases.

What I claim is:

1. An operating mechanism for an aircraft control element comprising a manual control for the element, a power-operated control for the said element, and means causing the latter to become active when the former is actuated, said manual control including a joy stick, said power control including a pulley loosely mounted for rocking movement relative to the joy stick, and means for connecting the joy stick with the pulley.

2. An operating mechanism for an aircraft control element comprising a manual control for the element, a power-operated control for the said element, and means causing the latter to become active when the former is actuated, including means for selectively rendering the power-operated control inoperative, said manual control including a joy stick, said power control including a pulley loosely mounted for rocking movement relative to the joy stick, and means for connecting the joy stick with the pulley.

3. An operating mechanism for an aircraft control element comprising a manual control for the element, a power-operated control for the said element, means for rendering the latter active when the former is actuated, including means for selectively rendering the power-operated control inoperative, and an automatically operating control having means associated therewith for rendering the latter control active when the manual control ceases, said manual control including a pivotally mounted hand piece, a spring, means connecting the hand piece with the spring and tending to move said hand piece to an inoperative position on the manual control for causing the power operated control for said element to become active.

4. An operating mechanism for an airplane control element comprising a manual control for the element, a power-operated control for the said element, means for rendering the latter active when the former is actuated, including means for selectively rendering the power-operated control inoperative, and an automatically operating control having means associated therewith for rendering the latter control active when the manual control ceases, the latter means including a handpiece normally held by the pilot effecting the control and arranged to allow the automatic control to become active when released by the pilot, said power control including a pulley, a manual control including a joy stick straddling the pulley, and movable normally independently of the pulley, means connected with the hand pieces and adapted when the hand piece is released to connect the pulley with the joy stick whereby the power operative control is rendered active.

5. An operating mechanism for an aircraft control element comprising a manually operated member for controlling the element, a power-operated control for the element having an independent member for operating the same, and means for rendering the latter member active when the former is actuated, said manual control including a pivotally mounted hand piece, a spring, means connecting the hand piece with the spring and tending to move said hand piece to an inoperative position on the manual control for causing the power operated control for said element to become active.

6. An operating mechanism for an aircraft control element comprising a manually operated member for controlling the element, a power-operated control for the element having an independent member for operating the same, and means for normally connecting the latter member to the former for cooperation of the two controls, including means for disconnecting the two members, said manually operated member including a joy stick divided with a longitudinal slot, a pulley rotatably mounted in the slot of the joy stick, said means for connecting the manually operated member to the power operated control including a pin adapted to lock the pulley for simultaneously rocking movement with the joy stick.

7. An operating mechanism for an aeroplane control element comprising a manually operated member for controlling the element, a power-operated control for the element having an independent member for operating the same, and means for normally connecting the latter member to the former for cooperation of the two controls, including means for disconnecting the two members, said means comprising a handpiece normally held by the pilot effecting the control and thereby establishing connection between the two members, but arranged to disconnect the members when released by the pilot.

8. An operating mechanism for an aircraft control element comprising a revolvable member controlling the element, a slotted joy stick pivoted coaxially therewith, a power-driven shaft and an operative connection between the joy stick, the shaft and the revolvable member causing the shaft to operate the latter member when the joy stick is moved relative to said member, said operative connections including a pin movable in the slotted joy stick and connecting the pulley and joy stick for simultaneous movement.

9. An operating mechanism for an aeroplane control element comprising a revolvable member controlling the element, a joy stick pivoted coaxially therewith, a power-driven shaft and an operative connection between the joy stick, the shaft and the revolvable member causing the shaft to operate the latter member when the joy stick is moved relative to said member, in combination with means for selectively fixing the revolvable member relative to the joy stick whereby the shaft connection is rendered inoperative.

10. An operating mechanism for an aircraft control element comprising a pulley controlling the element, a manually operated joy stick pivoted coaxially therewith and movable independently of the pulleys, a power-driven shaft, and means connecting the pulley with the joy stick so that the pulley will be selectively actuated by the joy stick either directly or through the medium of the power-driven shaft.

11. An operating mechanism for an aircraft control element comprising a pulley controlling the element, a manually operated joy stick pivoted coaxially therewith, a power-driven shaft and a cord leading from a point on the joy stick over the shaft to a diametrically opposite point on the pulley normally remaining slack so as to render the shaft inoperative, but tightened for causing the shaft to operate the pulley when the joy stick is swung on its pivot.

12. An operating mechanism for an aircraft control element comprising a pulley controlling the element, a manually operated joy stick pivoted coaxially therewith, a power-driven shaft and a cord leading from a point on the joy stick over the shaft to a diametrically opposite point on the pulley normally remaining slack so as to render the shaft inoperative but tightened for causing the shaft to operate the pulley when the joy stick is swung on its pivot, in combination with means for fixing the pulley relative to the joy stick whereby the shaft connection is rendered inoperative while the pulley may be actuated from the joy stick directly.

13. In an operating mechanism for an aeroplane control element, a pulley controlling the element, a manually operated joy stick pivoted coaxially therewith, a pivoted element associated with the operating end of the joy stick, a flexible member passing around the pulley having both ends secured to the pivoted element allowing the latter to tighten the flexible member upon the pulley for fixing the latter relative to the joy stick, a handpiece on the pivoted element mounted for normal manipulation by the hand of the pilot, yielding means tending to actuate the hand piece, and means associated with the hand piece and tending to counteract the yielding means, said hand piece when in operative position allowing relative motion between the joy stick and the pulley, but allowing fixed relation to be established when released by the pilot.

14. In an operating mechanism for an aircraft control element, a pulley controlling the element, a manually operated joy stick pivoted coaxially therewith, a handpiece pivoted in the operating end of the joy stick, and means operated thereby allowing a fixed relation or a relatively movable relation to be selectively established between the joy stick and the pulley, said last mentioned means including slots in the pulley and joy stick adapted to be normally aligned, a pin movable in the slots for locking the pulley to the joy stick, and a spring actuated hand piece connected with the pin tending to cause the pin to be moved in the aligned slots for locking the pulley to the joy stick.

15. In an operating mechanism for an aeroplane control element, a pulley controlling the element, a manually operated joy stick pivoted coaxially therewith, a handpiece pivoted in the operating end of the joy stick, and means operated thereby allowing the joy stick to be rotated relative to the pulley when the handpiece is pressed upon by the pilot, but fixing the pulley relative to the joy stick when the handpiece is released.

16. An automatic operating device for an aeroplane control element comprising a pivoted member operating the said element and a weight associated with the said member for operating the same when the aeroplane leaves a horizontal position, in combination with means allowing the weight to be normally arranged so that its center of gravity coincides with the center of the pivotal motion of the pivoted member whereby the weight is rendered inoperative.

17. An automatic operating device for an aeroplane elevator comprising an operating member for the elevator pivoted on a transverse horizontal axis and a weight associated therewith swinging forwardly or backwardly as the front of the aeroplane dips or rises and thereby operating the said member for righting the position of the aeroplane, in combination with means allowing the weight to be normally arranged so that its center of gravity lies on the horizontal axis whereby it is rendered inactive.

18. An automatic operating device for an aeroplane elevator comprising a longitudinal shaft having an operating member for the elevator pivoted thereto on a transverse axis, a weight straddling the shaft being vertically slidable on the said member, means for normally holding the weight in an inoperative position, and means for releasing the latter means causing the weight to drop along the operating member so as to actuate the same for righting the aeroplane when the same dips or rises.

19. An automatic operating device for an aeroplane elevator comprising a longitudinal shaft having an operating member for the elevator pivoted thereto on a transverse axis, a weight straddling the shaft being vertically slidable on the said member, means for normally holding the weight so that its center of gravity lies on the transverse axis, and means for releasing the latter means causing the weight to drop along the operating members so as to actuate the same for righting the plane when the same dips or rises.

20. An automatic operating device for aeroplane ailerons comprising a longitudinal shaft having means associated therewith for operating the ailerons when the shaft is rocked, a weight straddling the shaft with freedom of vertical sliding motion, means for normally holding the weight so that its center of gravity lies on the center line of the shaft, and means allowing the weight to be dropped so as to sway with the aeroplane and to rock the shaft for righting the position of the aeroplane when the latter sways sideway.

21. An automatic operating device for the elevator and the ailerons of an aeroplane comprising a longitudinal shaft having an operating member for the elevator pivoted thereto and having means associated therewith for operating the ailerons when the shaft is rocked, and a weight suspended from the operating member adapted to actuate the latter for righting the aeroplane when the latter dips or rises and to rock the shaft for righting the aeroplane when the latter sways laterally in combination with means for normally supporting the weight in an inoperative position.

22. An automatic operating device for the elevator and the ailerons of an aeroplane comprising a longitudinal shaft having an operating member for the elevator pivoted thereto and having means associated therewith for operating the ailerons when the shaft is rocked, and a weight suspended from the operating member adapted to actuate the latter for righting the aeroplane when the latter dips or rises, and to rock the shaft for righting the aeroplane when the latter sways laterally in combination with means for normally supporting the weight in an inoperative position, allowing the same to be dropped into an operative position by the release of a catch.

23. An operating mechanism for aircraft control elements, such as the elevators, ailerons and rudders, comprising in combination control elements, a plurality of manual means operatively connected with control elements, an assisting power operated means adapted to be operatively connected with the control elements, an automatic means adapted to be connected with the elevators and ailerons, the manual means for operating the rudders being independent of the manual means for operating the elevators and ailerons, and a plurality of means for operatively connecting the power operated means with the manual means.

24. An operating mechanism for aircraft control elements, such as the elevators, ailerons and rudders comprising in combination control elements, a plurality of manual means operatively connected with control elements, an assisting power operated means adapted to be operatively connected with the control elements, an automatic means adapted to be connected with the elevators and ailerons, the manual means for operating the rudders being independent of the manual means for operating the elevators and ailerons, and a plurality of means for operatively connecting the power operated means with the manual means, the manual means for the rudder comprising a pedal, the connecting means between the pedal and the power operated means being independent of the connecting means between the power operated means and the manual means for the elevators and ailerons.

25. An operating mechanism for aircraft control elements, such as the elevators, ailerons and rudders comprising in combination control elements, a plurality of manual means operatively connected with control elements, an assisting power operated means adapted to be operatively connected with the control elements, an automatic means adapted to be connected with the elevators and ailerons, the manual means for operating the rudders being independent of the manual means for operating the elevators and ailerons, and a plurality of means for operatively connecting the power operated means with the manual means, the manual means for the rudder comprising a pedal, the connecting means between the pedal and the power operated means being independent of the connecting means between the power operated means and the manual means for the elevators and ailerons, said connecting means between the power operated means and the pedal including means for rendering the power control means inactive.

26. An operating mechanism for aircraft control elements, such as the elevators, ailerons and rudders comprising in combination control elements, a plurality of manual means operatively connected with control elements, an assisting power operated means adapted to be operatively connected with the control elements, an automatic means adapted to be connected with the elevators and ailerons, the manual means for operating the rudders being independent of the manual means for operating the elevators and ailerons, and a plurality of means for operatively connecting the power operated means with the manual means, the manual means for the rudders comprising a pedal, said connecting means between the pedal and power operated means including means for rendering the connecting means inoperative.

27. An operating mechanism for aircraft control elements, such as the elevators, ailerons and rudders, comprising in combination control elements, a plurality of manual means operatively connected with control elements, an assisting power operated means adapted to be operatively connected with the control elements, an automatic means adapted to be connected with the elevators and ailerons, the manual means for operating the rudders being independent of the manual means for operating the elevators and ailerons, and a plurality of means for operatively connecting the power operated means with the manual means, said means for operatively connecting the power operated means with the manual means including a rockable means, and means for locking the rockable means to the manual means.

28. An operating mechanism for aircraft control elements, such as the elevators, ailerons and rudders, comprising in combination control elements, a plurality of manual means operatively connected with control elements, an assisting power operated means adapted to be operatively connected with the control elements, an automatic means adapted to be connected with the elevators and ailerons, the manual means for operating the rudders being independent of the manual means for operating the elevators and ailerons, and a plurality of means for operatively connecting the power operated means with the manual means, said means for operatively connecting the power operated means with the manual means including a rockable means, and a pin for locking the rockable means to the manual means.

29. An operating mechanism for aircraft control elements, such as the elevators, ailerons and rudders, comprising in combination control elements, a plurality of manual means operatively connected with control elements, an assisting power operated means adapted to be operatively connected with the control elements, an automatic means adapted to be connected with the elevators and ailerons, the manual means for operating the rudders being independent of the manual means for operating the elevators and ailerons, and a plurality of means for operatively connecting the power operated means with the manual means, said means for operatively connecting the power operated means with the manual means including a flexible means and a rockable means.

30. An operating mechanism for aircraft control elements, such as the elevators, ailerons and rudders, comprising in combination control elements, a plurality of manual means operatively connected with control elements, an assisting power operated means adapted to be operatively connected with the control elements, an automatic means adapted to be connected with the elevators and ailerons, the manual means for the rudders comprising a rockable member, a slotted foot pedal straddling the rockable member, a base, both the rockable member and the foot pedal being pivotally mounted on the base for independent movement, said assisting power operating means including a power driven shaft, an operative connection between the slotted foot pedal, the shaft, and the rockable member for causing the shaft to operate the rockable member when the foot pedal is actuated relative to said rockable member.

31. An operating mechanism for aircraft control elements, such as the elevators, ailerons and rudders, comprising in combination control elements, a plurality of manual means operatively connected with control elements, an assisting power operated means adapted to be operatively connected with the control elements, an automatic means adapted to be connected with the elevators and ailerons, the manual means for the rudders comprising a rockable member, a slotted foot pedal straddling the rockable member, a base, both the rockable member and the foot pedal being pivotally mounted on the base for independent movement, said assisting power operating means including a power driven shaft, an operative connection between the slotted foot pedal, the shaft, and the rockable member for causing the shaft to operate the rockable member when the foot pedal is actuated relative to said rockable member, and means for selectively fixing the rockable member to the foot pedal whereby the operative connections between the foot pedal, the shaft, and the rockable member are rendered inoperative.

32. An operating mechanism for aircraft control elements, such as the elevators, ailerons and rudders, comprising in combination control elements, a plurality of manual means operatively connected with control elements, an assisting power operated means adapted to be operatively connected with the control elements, an automatic means adapted to be connected with the elevators and ailerons, the manual means for the rudders comprising a rockable member, a slotted foot pedal straddling the rockable member, a base, both the rockable member and the foot pedal being pivotally mounted on the base for independent movement, said assisting power operating means including a power driven shaft, flexible connections between the slotted foot pedal, the shaft and the rockable member for causing the shaft to operate the rockable member when the foot pedal is actuated relative to said rockable member, said flexible connection permitting relative movement between the foot pedal and the rockable member, and means for connecting the rockable member to the foot pedal for rendering the flexible connections inoperative.

33. An operating mechanism for aircraft control elements such as elevators, ailerons and rudders, comprising in combination an assisting power operated means adapted to be operatively connected with the control elements, an automatic means adapted to be connected with the elevators and ailerons, independent means for controlling the elevators, independent means for controlling the ailerons, independent means for controlling the rudders, said independent means for controlling the rudders comprising a pulley, means connecting the pulley with the rudders, a rudder bar, said rudder bar being slotted along its longitudinal axis and straddling the pulley, a base, the rudder bar and pulley being rockably mounted for independent movement on the base, the assisting power operated means including a power driven shaft, and means for causing the pulley to be selectively actuated directly through the rudder bar or by the medium of the power driven shaft.

34. An operating mechanism for aircraft control elements such as elevators, ailerons and rudders, comprising in combination an assisting power operated means adapted to be operatively connected with the control elements, an automatic means adapted to be connected with the elevators and ailerons, independent means for controlling the elevators, independent means for controlling the ailerons, independent means for controlling the rudders, said independent means for controlling the rudders comprising a pulley, means connecting the pulley with the rudders, a rudder bar, said rudder bar being slotted along its longitudinal axis and straddling the pulley, a base, the rudder bar and pulley being rockably mounted for independent movement on the base, the assisting power operated means including a power driven shaft, means driven by the shaft, means engaging the driven means, and flexible connections between the last mentioned means and the pulley, and flexible means connecting the pulley with the rudder bar, the rudder bar when actuated causing the means engaging the driven means to actuate the flexible means for bringing the assisting power operated means into play.

35. An operating mechanism for aircraft control elements such as elevators, ailerons and rudders, comprising in combination an assisting power operated means adapted to be operatively connected with the control elements, an automatic means adapted to be connected with the elevators and ailerons, independent means for controlling the elevators, independent means for controlling the ailerons, independent means for controlling the rudders, said independent means for controlling the rudders comprising a pulley, means connecting the pulley with the rudders, a rudder bar, said rudder bar being slotted along its longitudinal axis and straddling the pulley, a base, the rudder bar and pulley being rockably mounted for independent movement on the base, the assisting power operated means including a power driven shaft, means driven by the shaft, means engaging the driven means, and flexible connections between the last mentioned means and the pulley, and flexible means connecting the pulley with the rudder bar, the rudder bar when actuated causing the means engaging the driven means to actuate the flexible means for bringing the assisting power operated means into play, and means for connecting the pulley to the rudder bar for rendering the power assisting control inactive.

36. An operating mechanism for aircraft control elements such as elevators, ailerons and rudders, comprising in combination an assisting power operated means adapted to be operatively connected with the control elements, an automatic means adapted to be connected with the elevators and ailerons, independent means for controlling the elevators, independent means for controlling the ailerons, independent means for controlling the rudders, said independent means for controlling the rudders comprising a pulley, means connecting the pulley with the rudders, a rudder bar, the assisting power operated means including a power driven shaft, drums rigid with the shaft, straps engaging the drums, flexible connections between the straps and the pulley, flexible connections between the pulley and the rudder bar whereby when the rudder bar is operated the straps will be tightened upon the drums and causing the pulley to be actuated through the power shaft.

37. An operating mechanism for aircraft control elements such as elevators, ailerons and rudders, comprising in combination an assisting power operated means adapted to be operatively connected with the control elements, an automatic means adapted to be connected with the elevators and ailerons, independent means for controlling the elevators, independent means for controlling the ailerons, independent means for controlling the rudders, said independent means for controlling the rudders comprising a pulley, means connecting the pulley with the rudders, a rudder bar, the assisting power operated means including a power driven shaft, drums rigid with the shaft, straps engaging the drums, flexible connections between the straps and the pulley, flexible connections between the pulley and the rudder bar whereby when the rudder bar is operated the straps will be tightened upon the pulleys and causing the pulley to be actuated through the power shaft, and means for connecting the rudder bar to the pulley for rendering the assisting power operated means inactive.

38. An operating mechanism for aircraft control elements such as elevators, ailerons and rudders, comprising in combination an assisting power operated means adapted to be operatively connected with the control elements, an automatic means adapted to be connected with the elevators and ailerons, independent means for controlling the elevators, independent means for controlling the ailerons, independent means for controlling the rudders, said independent means for controlling the rudders comprising a pulley, a rudder bar, the assisting power operated means including a power driven shaft, drums rigid with the shaft, straps engaging the drums, cables connected between the straps and the rudders, a portion of each cable being looped around a portion of the pulley, said cables being connected at opposite points on the pulley and to one side of the rudder bar, an end of each cable being connected to the rudder bar so that when the rudder bar is operated the pulley will be actuated and cause tightening of the straps on the drums, for causing the assisting power operated means to come into play.

39. An operating mechanism for aircraft control elements such as elevators, ailerons and rudders, comprising in combination an assisting power operated means adapted to be operatively connected to the control elements, a plurality of manual means for controlling the elevators, ailerons and rudders, a manual means for controlling the rudders comprising a pulley, a rudder bar, the power assisting operated means including a power driven shaft, drums rigid with the shaft, straps engaging the drums, cables leading from opposite points on the pulley and having an end connected to an end of a strap, cables connecting the other ends of the straps to the rudder bar, the portion of the first mentioned cables which lead from the pulley being looped around the portion of the pulley and extended to the rudders and connected to said rudders, said cables where looped around the pulley being connected at opposite points on the pulley and to one side of the rudder bar.

40. An operating mechanism for aircraft control elements such as elevators, ailerons and rudders, comprising in combination an assisting power operated means adapted to be operatively connected to the control elements, a plurality of manual means for controlling the elevators, ailerons and rudders, a manual means for controlling the rudders comprising a pulley, a rudder bar, the power assisting operated means including a power driven shaft, drums rigid with the shaft, straps engaging the drums, cables leading from opposite points on the pulley and having an end connected to an end of a strap, cables connecting the other ends of the straps to the rudder bar, the portion of the first mentioned cables which lead from the pulley being looped around the portion of the pulley and extended to the rudders and connected to said rudders, said cables where looped around the pulley being connected at opposite points on the pulley and to one side of the rudder bar, the cables being arranged to normally remain slack in order to prevent the straps from tightening on the drums to bring the assisting power operated means into play, said cables being adapted to be drawn taut when the rudder bar is actuated whereby the cables will cause the pulley to be actuated and whereby the straps will be tightened and cause the power assisting operated means to be brought into play, and means for connecting the pulley to the rudder bar to retain the cables slack for rendering inactive the power assisting operated means.

41. An operating mechanism for aircraft control elements such as ailerons comprising in combination a manual control for the ailerons, an assisting power operated control for said ailerons, an automatically operated control for said ailerons, a longitudinally extending operating shaft, means rigidly connected at one end of the shaft, means rockably mounted on the shaft adjacent the fixed means, flexible means connecting the fixed means on the shaft with the rockable means, and flexible means connecting the rockable means with the ailerons, and means connected with one of the flexible means for causing the assisting power operated means to be brought into play when the shaft is rocked, said manual control including a manual means for rocking of the shaft.

42. An operating mechanism for aircraft control elements such as ailerons comprising in combination a manual control for the ailerons, an assisting power operated control for said ailerons, an automatically operated control for said ailerons, a longitudinally extending operating shaft, means rigidly connected at one end of the shaft, means rockably mounted on the shaft adjacent the fixed means, flexible means connecting the fixed means on the shaft with the rockable means, and flexible means connecting the rockable means with the ailerons, and means connected with one of the flexible means for causing the assisting power operated means to be brought into play when the shaft is rocked, said manual control including a manual means for rocking of the shaft, and means for locking the rockable means to the fixed means for rendering inactive the assisting power operated means.

43. An operating mechanism for aircraft control elements such as ailerons comprising in combination a manual control for the ailerons, an assisting power operated control for said ailerons, an automatically operated control for said ailerons, a longitudinally extending operating shaft, means rigidly connected at one end of the shaft, means rockably mounted on the shaft adjacent the fixed means, flexible means connecting the fixed means on the shaft with the rockable means, and flexible means connecting the rockable means with the ailerons, and means connected with one of the flexible means for causing the assisting power operated means to be brought into play when the shaft is rocked, said manual control including a manual means for rocking the shaft, and a pin for locking the rockable means to the fixed means for rendering inactive the assisting power operated means.

44. An operating mechanism for aircraft control elements such as ailerons comprising in combination a manual control for the ailerons, an assisting power operated control for said ailerons, an automatically operated control for said ailerons, a longitudinally extending operating shaft, means rigidly connected at one end of the shaft, means rockably mounted on the shaft adjacent the fixed means, flexible means connecting the fixed means on the shaft with the rockable means, and flexible means connecting the rockable means with the ailerons, and means connected with one of the flexible means for causing the assisting power operated means to be brought into play when the shaft is rocked, said manual control including a manual means for rocking the shaft, and a pin for locking the rockable means to the fixed means for rendering inactive the assisting power operated means, a lever pivotally connected with the manual means, and means operatively connecting the lever with the pin so that when the lever is moved to a predetermined position said pin is moved to an inoperative position and permit independent relative movement between the rockable means and the fixed means.

45. An operating mechanism for aircraft control elements such as ailerons comprising in combination a manual control for the ailerons, an assisting power operated control for said ailerons, an automatically operated control for said ailerons, a longitudinally extending operating shaft, a slotted member rigidly connected with the shaft, a pulley loose on the shaft and straddled by the slotted member, a cable having its ends connected to the slotted member, said cable being connected to the pulley, cables connected with the pulley and to the ailerons, said assisting power operated control including power driven shafts arranged parallel to the operating shaft, the first mentioned cable including means for causing the slotted member and pulley to be actuated by the power driven shafts when the operating shaft is rocked by the manual means.

46. An operating mechanism for aircraft control elements such as ailerons comprising in combination a manual control for the ailerons, an assisting power operated control for said ailerons, an automatically operated control for said ailerons, a longitudinally extending operating shaft, a slotted member rigidly connected at one end of the shaft, a pulley loosely mounted on the shaft adjacent the fixed means, flexible means connecting the slotted member on the shaft with the pulley, said pulley being straddled by the slotted member, a cable connecting the pulley with the ailerons, said assisting power operated control including power driven shafts, said flexible means including straps, drums on the power driven shafts engaged by the straps whereby when the slotted member is rocked, the pulley will be rocked by the assisting power operated control, and means for locking the pulley to the slotted member for rendering the assisting power operated control inactive.

47. An operating mechanism for aircraft control elements such as ailerons comprising in combination a manual control for the ailerons, an assisting power operated control for said ailerons, a longitudinally extending operating shaft, a slotted member rigidly connected at one end of the shaft, a pulley loosely mounted on the shaft adjacent the fixed means, flexible means connecting the slotted member on the shaft with the pulley, said pulley being straddled by the slotted member, a cable connecting the pulley with the ailerons, said assisting power operated control including power driven shafts, said flexible means including straps, drums on the power driven shafts engaged by the straps whereby when the slotted member is rocked, the pulley will be rocked by the assisting power operated control, said slotted member having a vertical slot, the pulley having an arcuate slot and a vertical slot, opening into the arcuate slot, a pin normally seated in the vertical slot of the slotted member and the arcuate slot of the pulley, and means for moving the pin into the vertical slot of the pulley for locking the pulley to the slotted member whereby the assisting power operated control is rendered inactive.

48. An operating mechanism for aircraft control elements, such as elevators and ailerons, comprising a longitudinal shaft serving as the main operating member for controlling the elements and having elongated slots through its length, a fixed member rigid with one end of the shaft and rocked thereby, a manually operated joy stick pivotally mounted in a slot of the shaft, the joy stick having a longitudinal slot, a pulley controlling the elevators rockably mounted in the slot of the joy stick and on the same pivot of the joy stick, the fixed member having an elongated slot, a second pulley controlling the ailerons loosely mounted on the longitudinal shaft in the slot of the fixed member, a power driven shaft, a pair of parallelly disposed power driven shafts, operative connections between the joy stick, the first mentioned power driven shaft and the pulley controlling the elevators for causing the first mentioned shaft to operate the first mentioned pulley when the joy stick is moved relative to said pulley, operative connections between the fixed member, the parallelly disposed power driven shafts and the pulley controlling the ailerons, the parallelly disposed shafts through the associated connections causing operations of the second mentioned pulley when the fixed member is moved by the lateral rocking motion of the longitudinal shaft relative to said pulley.

49. An operating mechanism for aircraft control elements, such as elevators and ailerons comprising a longitudinal shaft serving as the main operating member for controlling the elements, a manually operated joy stick, the shaft being slotted for straddling the joy stick, one end of the shaft having a fixed member rigid thereon, a pulley for controlling the elevators, the joy stick being slotted through the longitudinal axis for straddling the pulley, the pulley being rockably mounted in the slot of the joy stick and in the slot of the longitudinal shaft, the pulley and joy stick having a common pivot and movable independently of each other, a fixed member being slotted, a pulley for controlling the ailerons mounted at the front end of the shaft and straddled by the slotted fixed member, a power driven shaft and a pair of parallelly disposed power driven shafts for assisting the manual operation of the elements and operative connections between the joy stick, the first mentioned power shaft and the pulley controlling the elevator, and operative connections between the fixed member, the parallel shafts and the pulley controlling the ailerons, said connections causing the power driven shafts to operate the pulleys associated therewith when the joy stick and the fixed member are moved relative to the respectively straddled pulleys.

50. An operating mechanism for aircraft control elements, such as elevators and ailerons, comprising a slotted longitudinal shaft serving as the main operating member for controlling the elements, a slotted joy stick and a slotted fixed member associated with the shaft for controlling the elements, a rockable pulley controlling the elevators associated with the joy stick, a rockable pulley controlling the ailerons associated with the fixed member, a power driven shaft, a pair of parallel power driven shafts driven by the first mentioned power shaft and operative connections between the joy stick, the shaft and the pulley controlling the elevators, and operative connections between the fixed member, the parallel shafts and the pulley controlling the ailerons for causing the shafts to operate the two pulleys when the joy stick and the fixed member are moved relative to said pulleys.

51. An operating mechanism for aircraft control elements, such as elevators and ailerons, comprising a slotted longitudinal shaft serving as the main operating member for controlling the elements, a slotted joy stick and a slotted fixed member associated with the shaft for controlling the said elements, a rockable pulley controlling the elevator associated with the joy stick, and a rockable pulley controlling the ailerons associated with the fixed member, a power driven shaft, a pair of parallel power driven shafts, operative connections between the joy stick, the shaft and the pulley controlling the elevators, and operative connections between the fixed member, the parallel shafts, and the pulley controlling the ailerons for causing the shafts to operate the pulleys when the joy stick and the fixed member are moved relative to their associated pulleys, means for selectively fixing the rockable pulleys relative to the joy stick and the fixed member whereby the connections with the shafts are rendered inoperative.

52. An operating mechanism for aircraft control elements such as elevators and ailerons, comprising a slotted longitudinal shaft serving as the main operating member for controlling the elements, a slotted joy stick and a slotted fixed member associated with the shaft for controlling said elements, a rockable pulley controlling the elevators associated with the joy stick and a rockable pulley controlling the ailerons associated with the fixed member, a power driven shaft, a pair of parallel power driven shafts, a plurality of means for causing the pulleys to be selectively actuated by the joy stick and by the fixed member directly or through the medium of the power driven shafts.

53. An operating mechanism for aircraft control elements such as elevators and ailerons comprising a slotted manually operated shaft serving as the main operating member for controlling the elements, a slotted joy stick and a slotted fixed member associated with the shaft for controlling said elements, a rockable pulley controlling the elevators associated with the joy stick, a rockable pulley controlling the ailerons associated with the fixed member, a power driven shaft, a pair of parallel power shafts driven by the first mentioned power shaft, said power shafts having grooved drums rigid thereto, a cable trained around and connected intermediate its ends to the pulley associated with the joy stick, one portion of the cable leading from the top of the pulley and trained over a drum on the first mentioned power shaft and twisted with the end thereof connected to the lower end of the joy stick, the other portion of the cable leading from the bottom of said pulley, trained around the drum and having the end thereof secured to an upper end of the joy stick, said cable being normally slack for rendering the first mentioned power shaft inoperative, and flexible connections between the fixed member, the drum of the parallel shafts and the pulley associated with the fixed member.

54. An operating mechanism for aircraft control elements such as elevators and ailerons comprising a slotted manually operated shaft serving as the main operating member for controlling the elements, a slotted joy stick and a slotted fixed member associated with the shaft for controlling said elements, a rockable pulley controlling the elevators associated with the joy stick, a rockable pulley controlling the ailerons associated with the fixed member, a power driven shaft, a pair of parallel power shafts driven by the first mentioned power shaft, said power shaft having grooved drums rigid thereto, a cable trained around and connected intermediate its ends to the pulley associated with the joy stick, one portion of the cable leading from the top of the pulley and trained over a drum on the first mentioned power shaft and twisted with the end thereof connected to the lower end of the joy stick, the other portion of the cable leading from the bottom of said pulley, trained around the drum and having the end thereof secured to an upper end of the joy stick, said cable being normally slack for rendering the first mentioned power shaft inoperative, and flexible connection between the fixed member, the drum of the parallel shafts and the pulley associated with the fixed member, means for fixing the pulley controlling the elevators relative to the joy stick, and means for fixing the pulley controlling the ailerons relative to the fixed member whereby the shafts connection is rendered inoperative while the pulleys may be actuated from the joy stick and from the fixed member directly.

55. In an operating mechanism for aircraft control elements, comprising a slotted longitudinal shaft adapted to be manually operated, a slotted joy stick and a slotted fixed member associated with the shaft, a rockable pulley for controlling the elevators associated with the joy stick, and a rockable pulley controlling the ailerons associated with the fixed member, a handpiece pivoted on the joy stick, a spring for actuating the handpiece, means connected with the handpiece and operated thereby, said means when actuated by the spring and handpiece being adapted to connect the rockable pulley with the joy stick so that the pulley will be simultaneously moved with the joy stick, and means operated by the spring and handpiece for locking the fixed member to the pulley which controls the ailerons.

56. In an operating mechanism for aircraft control elements, comprising a slotted longitudinal shaft adapted to be manually operated, a slotted joy stick and a slotted fixed member associated with the shaft, a rockable pulley for controlling the elevators associated with the joy stick, and a rockable pulley controlling the ailerons associated with the fixed member, a handpiece pivoted on the joy stick, a spring for actuating the handpiece, means connected with the handpiece and operated thereby, said means when actuated by the spring and handpiece being adapted to connect the rockable pulley with the joy stick so that the pulley will be simultaneously moved with the joy stick, and means operated by the spring and handpiece for locking the fixed member to the pulley which controls the ailerons, said handpiece adapted to be manually operated against the tension of the spring for causing the means which locks the joy stick to its associated pulley and the means for locking the fixed member with its associated pulley to be released from the locking positions.

57. In an operating mechanism for aircraft control elements, comprising a slotted longitudinal shaft adapted to be manually operated, a slotted joy stick and a slotted fixed member associated with the shaft, a rockable pulley for controlling the elevators associated with the joy stick, and a rockable pulley controlling the ailerons associated with the fixed member, a handpiece pivoted on the joy stick, said joy stick comprising a hollow barrel, a spring mounted in the hollow barrel, and operatively connected with the handpiece, means for locking the joy stick to the pulley associated therewith and connected with the handpiece, said spring being adapted to automatically actuate the handpiece for moving the locking means to operative position, means for locking the fixed member to the pulley associated therewith, and means connecting the locking means with the handpiece, said locking means being adapted to be moved to locking position when the spring operates the handpiece.

58. In an operating mechanism for aircraft control elements, comprising a slotted longitudinal shaft adapted to be manually operated, a slotted joy stick and a slotted fixed member associated with the shaft, a rockable pulley for controlling the elevators associated with the joy stick, and a rockable pulley controlling the ailerons associated with the fixed member, a handpiece pivoted on the joy stick, said joy stick comprising a hollow barrel, a spring mounted in the hollow barrel and operatively connected with the handpiece, a rack slidably mounted in the hollow barrel, said handpiece having a sector gear rigid therewith and in mesh with the rack, means for locking the joy stick to the pulley associated therewith, a wire connecting said locking means with the rack, said spring being adapted to automatically actuate the handpiece and the gear for sliding the rack and moving the locking means to a locking position, means for locking the fixed member to the pulley associated therewith, and a wire connecting said locking means with the rack, the last mentioned locking means being adapted to be moved to locking position when the spring operates the handpiece and the rack, said handpiece adapted to be manually operated for releasing both the locking means simultaneously.

59. In an operating mechanism for aircraft control elements comprising a slotted longitudinal shaft adapted to be manually operated, a slotted joy stick and a slotted fixed member associated with the shaft, a rockable pulley for controlling the elevators associated with the joy stick, and a rockable pulley controlling the ailerons associated with the fixed member, a handpiece pivoted on the joy stick, said joy stick comprising a hollow barrel, a spring mounted in the hollow barrel and operatively connected with the handpiece, means for locking the joy stick to the pulley associated therewith and connected with the handpiece, said spring being adapted to automatically actuate the handpiece for moving the locking means to operative position, means for locking the fixed member to the pulley associated therewith, and means connecting the locking means with the handpiece, an automatic means operatively connected with the operating means for the ailerons and elevators, means for locking the automatic means in an inoperative position, and means connecting the locking means with the handpiece, the locking means for the automatic means being adapted to be simultaneously released with the locking of the joy stick to its associated pulley and the fixed member to its associated pulley.

60. An automatically operating device for aircraft control elements such as elevators and ailerons comprising a weight which is normally supported in an inactive position but adapted to be dropped into an operative position, means for locking the weight in an inoperative position, and means for releasing the locking means, mechanism operatively connected with the elevators and ailerons for controlling movement of the same, said weight dropped in an operative position adapted to swing in accordance with the movements of the aircraft for operating the mechanism controlling the elevators and ailerons in a similar manner as the joy stick would do if normally actuated by the pilot for maintaining the aircraft in a normal flying position.

61. An automatically operating device for aircraft control elements such as elevators and ailerons comprising a weight which is normally supported in an inactive position but adapted to be dropped into an operative position, means for locking the weight in an inoperative position, and means for releasing the locking means, mechanism operatively connected with the elevators and ailerons for controlling movement of the same, said weight when dropped in an operative position adapted to swing in accordance with the movements of the aircraft for operating the mechanism controlling the elevators and ailerons in a similar manner as the joy stick would do if normally actuated by the pilot for maintaining the aircraft in a normal flying position, and manually operated means for returning the weight to an inoperative position.

62. An automatically operating device for aircraft control elements such as elevators and ailerons comprising a weight which is normally supported in an inactive position but adapted to be dropped into an operative position, means for locking the weight in an inoperative position, and means for releasing the locking means, mechanism operatively connected with the elevators and ailerons for controlling movement of the same, said weight when dropped in an operative position adapted to swing in accordance with the movements of the aircraft for operating the mechanism controlling the elevators and ailerons in a similar manner as the joy stick would do if normally actuated by the pilot for maintaining the aircraft in a normal flying position, and manually operated means for returning the weight to an inoperative position, and means for locking the manually operated means to prevent release of the weight, said means adapted to be actuated for permitting the weight to be automatically released by the first mentioned locking means for the weight.

63. An automatically operating device for aircraft control elements such as elevators and ailerons and comprising a weight, drums, cables connecting the drums with the weight, and supporting the weight when it is normally held in operative position, said weight tending to rotate the drums, means for locking the drum against rotation by the weight, a spring actuated means normally held against movement and connected with the locking means, said spring actuated means when released causing actuation of the locking means to release the drums and likewise the weight to an operative swinging position, and operative connections between the weight and the ailerons and elevators whereby the swinging of the weight will cause the operative connections to move the elevators and ailerons to a predetermined position for maintaining the aircraft in a normal flying position.

64. An automatically operating device for aircraft control elements such as elevators and ailerons and comprising a weight, drums, cables connecting the drums with the weight, and supporting the weight when it is normally held in operative position, said weight tending to rotate the drums, means for locking the drums against rotation by the weight, a spring actuated means normally held against movement and connected with the locking means, said spring actuated means when released causing actuation of the locking means to release the drums and likewise the weight to an operative swinging position, and operative connections between the weight and the ailerons and elevators whereby the swinging of the weight will cause the operative connections to move the elevators and ailerons to a predetermined position for maintaining the aircraft in a normal flying position, manually operated means for returning the weight to an inoperative position and an additional locking means for the manually operated means for preventing reverse movement of the manually operated means by the drum.

65. An automatically operating device for aircraft control elements such as elevators and ailerons and comprising a weight, drums, cables connecting the drums with the weight, and supporting the weight when it is normally held in operative position, said weight tending to rotate the drums, means for locking the drums against rotation by the weight, a spring actuated means normally held against movement and connected with the locking means, said spring actuated means when released causing actuation of the locking means to release the drums and likewise the weight to an operative swinging position, and operative connections between the weight and the ailerons and elevators whereby the swinging of the weight will cause the operative connections to move the elevators and ailerons to a predetermined position for maintaining the aircraft in a normal flying position, manually operated means for returning the weight to an inoperative position and an additional locking means for the manually operated means for preventing reverse movement of the manually operated means by the drum, said locking means for the manually operated means being adapted to be moved to an inoperative position for releasing the manually operated means whereby the spring actuated means when released may release its associated locking means to permit the weight moving to an operative position.

66. An automatically operating device for aircraft control elements such as elevators and ailerons and comprsing a weight, drums, cables connecting the drums with the weight, and supporting the weight when it is normally held in operative position, said weight tending to rotate the drums, means for locking the drum against rotation by the weight, a spring actuated means normally held against movement and connected with the locking means, said spring actuated means when released causing actuation of the locking means to release the drums and likewise the weight to an operative swinging position, and operative connections between the weight and the ailerons and elevators whereby the swinging of the weight will cause the operative connections to move the elevators and ailerons to a predetermined position for maintaining the aircraft in a normal flying position, manual means for revolving the drums to return the weights to the normal inoperative position and comprising gears operatively connected with the drums, a clutch member associated with one of the gears, means for rotating the gears, a disc operatively connected with one of the clutch members, a lever pivoted adjacent said disc and provided with a cam having a groove adapted to engage the disc for moving the disc and likewise one of the clutch members relative to the other clutch member for either releasing or throwing said clutch members into operative relation, and means for normally maintaining one of the clutch members against rotation in one direction, the said direction of rotation being synonymous with the direction of rotation of the clutch member when the drum is reversely rotated by the weight.

67. An automatically operating device for aircraft control elements such as elevators and ailerons comprising a weight which is normally supported in an inactive position but adapted to be released to a pending operative position, means for locking the weight in an inoperative position, and means for releasing the locking means, a shaft adapted to be manually rocked, means operatively connecting the rock shaft with the ailerons whereby when the shaft is rocked the ailerons will be actuated, and means operatively connected with the elevators for actuating the same, said weight being slotted and straddling the shaft, means for supporting the weight on the shaft, said means including means for causing the weight to rock the shaft when said weight is swung laterally by the lateral oscillation of the aircraft, a pulley mounted in the slotted portion of the weight and having connections with the manual control for the elevators, and operative connections with the controlling means for the elevators, said weight when swung along its longitudinal axis being adapted to rock the pulley associated with the weight and thereby automatically actuate the elevators while transverse rocking of the weight causes rocking of the shaft and likewise actuation of the ailerons.

68. An automatically operating device for aircraft control elements such as elevators and ailerons comprising a weight which is normally supported in an inactive position but adapted to be released to a pending operative position, a shaft adapted to be manually rocked and having operative connections with the ailerons, said weight being slotted and straddling the shaft, hangers for slidably supporting the weight on the shaft but connecting the weight to the shaft in such a manner that when the weight is rocked the shaft will be rocked. a pulley mounted in the slotted portion of the weight and pivotally mounted on the shaft, manual means operatively connected with the elevators for controlling the elevators, means operatively connecting the pulley with the manually operating means for the elevators, means for locking the weight in an inoperative position, and means for releasing the locking means to permit the weight to move to an operative position, said weight when in an operative position being adapted to swing in accordance with the tilting movements of the plane whereby the elevators will be automatically operated by the pulley associated with the weight or the ailerons will be automatically operated by the rocking of the shaft to maintain the aircraft in a normal flying position.

69. An operating mechanism for aircraft control elements such as elevators and ailerons comprising in combination a manual control for the elevators, a manual control for the ailerons, an assisting power operated control for the elevators and ailerons and including power driven shafts operatively connected together, a worm gear on one of the shafts, a worm adapted to normally mesh with the worm gear for operating the power driven shafts, and means for moving the worm away from the worm gear to release the power from the power driven shafts, means for operatively connecting the manual control for the elevators with the assisting power operated control through certain of the shafts, and means for operaively connecting the manual control for the ailerons with the assisting power operated control through the other power driven shafts.

70. In an automatic stabilizing system for aircraft, the combination with an operating mechanism for an aircraft control element, of a manual control for the element, an automatically operated control for the element, and means for rendering the latter control active when the manual control ceases, the last means comprising a selecting device operatively associated with the element, a steering lever, a handpiece associated with the lever, an actuating mechanism carried by the lever, and means operatively connecting the handpiece, actuating mechanism, selecting device, and the element for actuating the latter when the handpiece is held in certain positions by the pilot.

71. In an automatic stabilizing system for aircraft, the combination with an operating mechanism for an aircraft control element, of a manually operated control for the element, an assisting power operated control for the element, means operatively connecting the controls for actuating the assisting power operated control when the manually operated control is actuated, including means for discontinuing the assisting power operated control, an automatically operated control for the element operable when the manually operated control ceases or is discontinued, means for selectively rendering said automatically operated control active or inactive at the option of the pilot, said automatically operated control comprising a weight normally held suspended in an inactive position but adapted to be dropped to occupy an operative position should the pilot cease to control the manually operable control, and a selecting device including an actuating mechanism for controlling the weight, and means operatively connecting the device, the weight, and the controls for the element.

72. In an automatic stabilizing system for aircraft, the combination with an operating mechanism for an aircraft control element, of a manually operated control for the element, an assisting power operated control for the element, means operatively connecting the controls for actuating the assisting power control when the manually operable control is actuated, including means for discontinuing the assisting power operated control, an automatically operated control for the element operable when the manually operable control ceases or is discontinued, means for selectively rendering said automatically operated control active or inactive at the option of the pilot, said automatically operated control comprising a suspended weight normally held in an inactive position yet capable of being released to occupy an operative position when the pilot ceases to control the manually operable control, and means for controlling the weight, the last means comprising an actuating mechanism operatively associated with the element, for raising and lowering the weight, and an operative connection between said actuating mechanism, the weight, and the controls for the element.

73. In an automatic stabilizing system for aircraft, the combination with a controlling apparatus for an aircraft control element, of a manual control for the element, an assisting power operated control for the element, and an automatically operated control for the element, means for causing the assisting power control to co-operate with the manual control, including means for causing the assisting power operated control to be discontinued, and means for causing the automatically operated control to become active when the manual control ceases or is discontinued, means for selectively causing said automatically operated control to remain inactive or active, said manual control comprising a steering lever assembly including an actuating mechanism and a handpiece, a handpiece at the grip of said lever, a pulley movably mounted on the lever, said assisting power control comprising a continuously rotating element operatively connected to the manual control, said automatically operated control comprising a suspended weight normally held in an inactive position but adapted to be dropped into an operative position when the handpiece is released by the pilot.

74. In an automatic stabilizing system for aircraft, the combination with an operating mechanism for an aircraft control element, of a manually operated control for the element, an assisting power operated control for the element, and an automatically operated control for the element, means operatively connecting said controls by which the assisting power operating control can be utilized to assist the manually operated control including means for selectively rendering said assisting power operated control active or inactive, means normally acting to maintain the automatically operated control inactive, means for rendering the automatically operated control active when control of the manually operated control ceases, means for selectively rendering the automatically operated control active or inactive at the option of the pilot, and means for restoring the automatically operated control to its inactive condition after being rendered active.

JOSEPH G. YONKESE.